United States Patent
Rogness et al.

(10) Patent No.: US 11,879,768 B2
(45) Date of Patent: *Jan. 23, 2024

(54) METHODS AND APPARATUS TO GENERATE AN AUGMENTED ENVIRONMENT INCLUDING A WEIGHT INDICATOR FOR A VEHICLE

(71) Applicant: Ford Global Technologies, LLC, Dearborn, MI (US)

(72) Inventors: Anton Rogness, Dearborn, MI (US); Peter Simeon Lazarevski, Dearborn, MI (US); Joshua Rajasingh, Ypsilanti, MI (US); Andrew Niedert, Farmington Hills, MI (US); Elliott Pearson, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

This patent is subject to a terminal disclaimer.

(21) Appl. No.: 17/389,073

(22) Filed: Jul. 29, 2021

(65) Prior Publication Data
US 2021/0390307 A1 Dec. 16, 2021

Related U.S. Application Data

(63) Continuation-in-part of application No. 17/236,602, filed on Apr. 21, 2021, now Pat. No. 11,398,090, (Continued)

(51) Int. Cl.
*G06K 9/00* (2022.01)
*G06K 9/62* (2022.01)
(Continued)

(52) U.S. Cl.
CPC ............ *G01G 19/12* (2013.01); *G01G 23/32* (2013.01); *G06F 18/25* (2023.01); *G06T 19/006* (2013.01);
(Continued)

(58) Field of Classification Search
None
See application file for complete search history.

(56) References Cited

U.S. PATENT DOCUMENTS

| 6,490,515 B1 | 12/2002 | Okamura et al. |
| 8,364,439 B2 | 1/2013 | Mintz et al. |
| (Continued) | | |

FOREIGN PATENT DOCUMENTS

| DE | 102014001031 | 7/2015 |
| DE | 102014216076 | 2/2016 |
| EP | 1512575 | 3/2005 |

OTHER PUBLICATIONS

United States Patent and Trademark Office, "Non-Final Office Action," dated Dec. 11, 2019 in connection with U.S. Appl. No. 16/191,134, 8 pages.

(Continued)

*Primary Examiner* — Mohammad J Rahman
(74) *Attorney, Agent, or Firm* — Lorne Forsythe; Hanley, Flight & Zimmerman, LLC

(57) ABSTRACT

Methods and apparatus to generate an augmented environment including a weight indicator for a vehicle are disclosed herein. An example apparatus disclosed herein includes memory including stored instructions, a processor to execute the instructions to generate a map of loads on a vehicle based on load data associated with a sensor of the vehicle, determine a load condition of the vehicle based on the map of loads, correlate a first load of the map of loads with an object identified using live video data received from a camera, and generate an augmented environment identifying at least one of a location of the object, the first load correlated with the object, or the load condition.

23 Claims, 13 Drawing Sheets

Related U.S. Application Data which is a continuation of application No. 16/191,134, filed on Nov. 14, 2018, now Pat. No. 10,990,822.

(60) Provisional application No. 62/497,317, filed on Oct. 15, 2018.

(51) Int. Cl.

| | |
|---|---|
| *G06T 19/00* | (2011.01) |
| *G01G 19/12* | (2006.01) |
| *G01G 23/32* | (2006.01) |
| *G06V 20/20* | (2022.01) |
| *G06F 18/25* | (2023.01) |
| *B60W 40/13* | (2012.01) |
| *B60R 1/00* | (2022.01) |

(52) U.S. Cl.
CPC ............. *G06V 20/20* (2022.01); *B60R 1/00* (2013.01); *B60W 40/13* (2013.01)

(56) References Cited

U.S. PATENT DOCUMENTS

| | | | |
|---|---|---|---|
| 8,760,515 B2 | 6/2014 | Abe et al. | |
| 10,053,088 B1 | 8/2018 | Askeland | |
| 10,303,961 B1 | 5/2019 | Stoffel et al. | |
| 10,990,822 B2 | 4/2021 | Rogness et al. | |
| 2008/0031492 A1* | 2/2008 | Lanz | G06V 40/103 |
| | | | 382/103 |
| 2012/0010851 A1 | 1/2012 | Mintz et al. | |
| 2012/0191272 A1* | 7/2012 | Andersen | B66F 9/24 |
| | | | 705/28 |
| 2013/0116859 A1 | 5/2013 | Ihlenburg et al. | |
| 2015/0019165 A1 | 1/2015 | Theuss et al. | |
| 2015/0054950 A1 | 2/2015 | Van Wiemeersch | |
| 2016/0221591 A1 | 8/2016 | Kuehbandner et al. | |
| 2016/0305814 A1 | 10/2016 | Pita-Gil | |
| 2017/0267159 A1 | 9/2017 | Bruhn | |
| 2017/0293809 A1 | 10/2017 | Thompson et al. | |
| 2018/0060884 A1 | 3/2018 | Jones et al. | |
| 2018/0068266 A1 | 3/2018 | Kirmani et al. | |
| 2018/0096289 A1 | 4/2018 | Terwilliger et al. | |
| 2018/0179732 A1 | 6/2018 | Bartsch et al. | |
| 2018/0197139 A1 | 7/2018 | Hill | |
| 2018/0211219 A1 | 7/2018 | Scott | |
| 2018/0244187 A1 | 8/2018 | Strano et al. | |
| 2019/0043004 A1 | 2/2019 | Lesieur et al. | |
| 2019/0086917 A1 | 3/2019 | Okimoto et al. | |
| 2019/0124619 A1 | 4/2019 | Arumugam et al. | |
| 2019/0232971 A1 | 8/2019 | Vijayakumar | |
| 2019/0302794 A1 | 10/2019 | Kean et al. | |
| 2020/0132487 A1 | 4/2020 | Colby | |

OTHER PUBLICATIONS

United States Patent and Trademark Office, "Final Office Action," dated May 28, 2020 in connection with U.S. Appl. No. 16/191,134, 9 pages.

United States Patent and Trademark Office, "Notice of Allowance," dated Dec. 30, 2020 in connection with U.S. Appl. No. 16/191,134, 7 pages.

* cited by examiner

METHODS AND APPARATUS TO GENERATE AN AUGMENTED ENVIRONMENT INCLUDING A WEIGHT INDICATOR FOR A VEHICLE

RELATED APPLICATION

This patent arises from a continuation-in-part of U.S. patent application Ser. No. 17/236,602, filed on Apr. 21, 2021, and entitled "METHODS AND APPARATUS TO GENERATE AN AUGMENTED ENVIRONMENT INCLUDING A WEIGHT INDICATOR FOR A VEHICLE," which is a continuation of U.S. patent application Ser. No. 16/191,134, filed on Nov. 14, 2018 and entitled "METHODS AND APPARATUS TO GENERATE AN AUGMENTED ENVIRONMENT INCLUDING A WEIGHT INDICATOR FOR A VEHICLE," which claims the benefit of U.S. Provisional Patent Application Ser. No. 62/497,317, which was filed on Oct. 15, 2018. U.S. patent application Ser. No. 16/191,134, U.S. patent application Ser. No. 15/955,437, and U.S. Provisional Patent Application Ser. No. 62/497,317 are incorporated herein in their entirety.

FIELD OF THE DISCLOSURE

This disclosure relates generally to vehicle loads and, more particularly, to methods and apparatus to generate an augmented environment including a weight indicator for a vehicle.

BACKGROUND

All vehicles have a maximum limit on a load the front and rear axles can withstand. In some examples, each axle has a gross axle weight rating (GAWR) that corresponds to the maximum load that may be supported by the axle. Additionally, weight can be poorly distributed on/in the vehicle. If an axle of the vehicle is overloaded or the vehicle is unbalanced, the vehicle may not perform to customer expectations. In some examples, a vehicle may be misloaded if a particular axle or suspension assembly is bearing a disproportionate amount of the total load on the vehicle. Loading issues can often be corrected by redistributing objects (e.g., cargo, passengers, etc.) to different sections of the vehicle.

Mobile devices (e.g., smart phones, headsets, etc.) can now support augmented reality (AR) technology that allows virtual information to augment live video data captured by the mobile device. Augmented reality technology can add and/or remove information from the video data as the video data is presented to user (e.g., by the display of the mobile device). In some examples, AR technology can allow information to be intuitively presented to a user by overlaying relevant virtual information onto video of a physical environment in real-time.

SUMMARY

An example apparatus disclosed herein includes memory including stored instructions, a processor to execute the instructions to generate a map of loads on a vehicle based on load data associated with a sensor of the vehicle, determine a load condition of the vehicle based on the map of loads, correlate a first load of the map of loads with an object identified using live video data received from a camera, and generate an augmented environment identifying at least one of a location of the object, the first load correlated with the object, or the load condition.

An example method disclosed herein includes generating a map of loads on a vehicle based on load data associated with a sensor of the vehicle, determining a load condition of the vehicle based on the map of loads, correlating a first load of the map of loads with an object identified using live video data received from a camera, and generating an augmented environment identifying at least one of a location of the object, the first load correlated with the object, or the load condition.

An example non-transitory computer readable medium disclosed herein includes instructions, which, when executed cause a processor to generate a map of loads on a vehicle based on load data associated with a sensor of the vehicle, determine a load condition of the vehicle based on the map of loads, correlate a first load of the map of loads with an object identified using live video data received from a camera, and generate an augmented environment identifying at least one of a location of the object, the first load correlated with the object, or the load condition.

An example method of indicating the loading of a vehicle disclosed herein includes generating a map of loads on a vehicle based on load data associated with a sensor of the vehicle, determining the load condition of the vehicle based on the map of loads by comparing a load on the vehicle to a first load threshold, the load determined based on the load data, generating an augmented environment identifying the load condition, and controlling an external light of the vehicle based on the comparison of the load to the load threshold to indicate the load condition.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
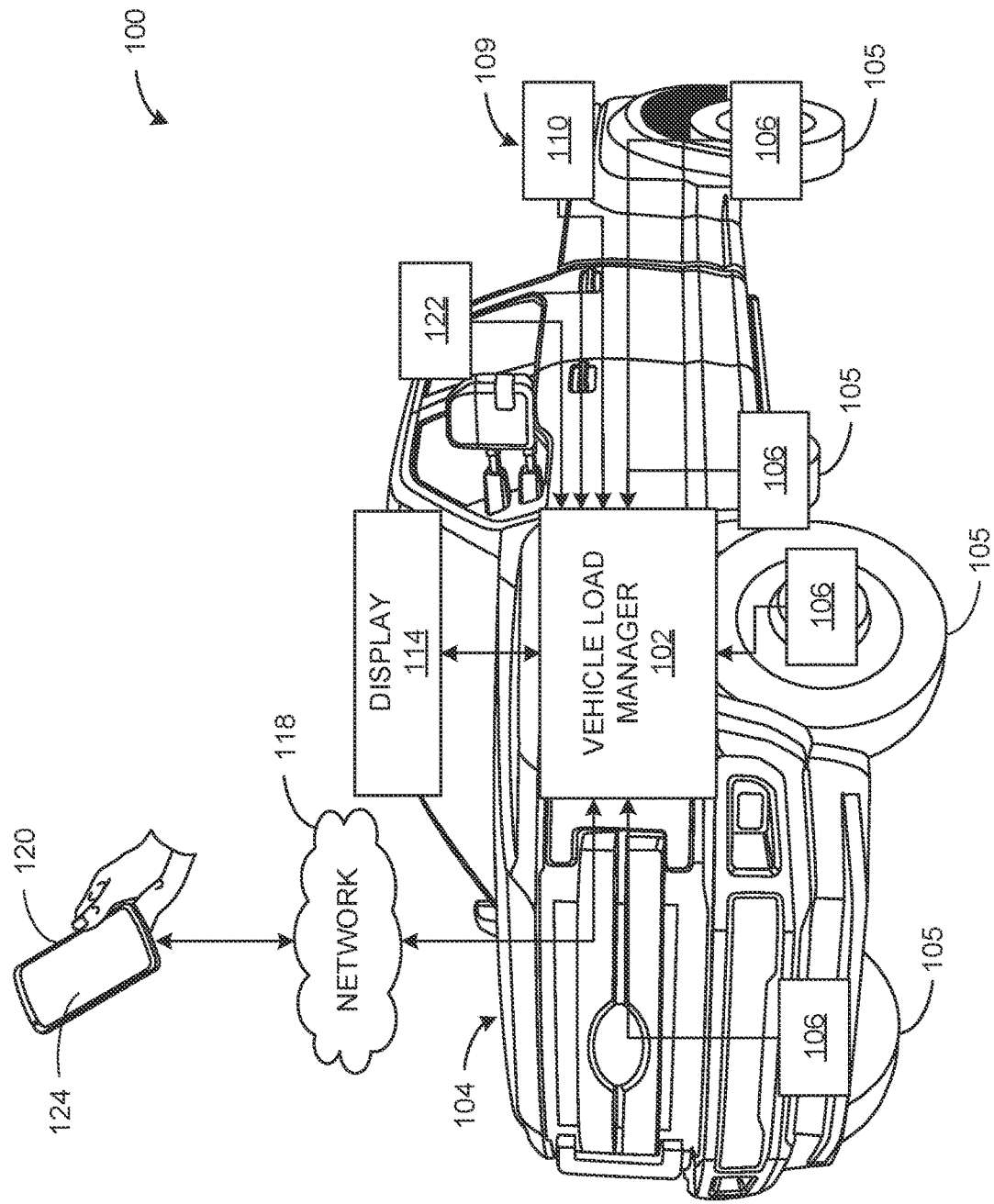
FIG. 1 illustrates an environment of an example vehicle load manager that can be used with an example vehicle with which the examples disclosed herein can be implemented.

Misloading a vehicle can affect the performance of the vehicle. As used herein, the phrase "misloading a vehicle" and all variations thereof, refers to distributing objects on/in a vehicle in such a manner that adversely affects the performance of the vehicle, and can, for example, include exceeding the GAWR of one or both axles, exceeding a weight rating of a suspension assembly, unbalancing a weight distribution associated with the vehicle, etc. In some examples, redistributing the load (passengers, cargo, etc.) on a vehicle can alleviate some or all problems caused by misloading a vehicle. In other examples, removing a load from the vehicle can be required. Traditional means of displaying this information to a user (e.g., a warning light of the dashboard, etc.) may not be intuitive or provide sufficient information for a user to quickly and effectively understand and then correct a loading issue. This lack of intuitiveness or information may lead to a misloaded vehicle. As used herein, the phrase "overloading a vehicle" and all variations thereof, refers to a type of vehicle misloading in which the load on the vehicle exceeds a predetermined threshold (e.g., the GAWR of one or both axles, a total vehicle weight rating, etc.).

Methods and apparatus disclosed herein combine load data collected by vehicle sensors and live video data to generate an augmented reality environment including the loading condition of a vehicle and weights borne by components of the vehicle. As used herein, the phrase "augmented reality environment" (also referred to herein as an "augmented environment") is a virtual environment that includes a representation of a physical space (e.g., captured by a video camera) on which computer-generated perceptual information is overlaid (e.g., virtual objects are added, physical objects are hidden, etc.). In some examples disclosed herein, objects on/in the vehicle are identified and correlated to load data detected by vehicle sensor(s). In some examples disclosed herein, a map of object shapes, positions, and loads is generated. In some examples disclosed herein, guidance in the form of visual instructions are displayed in the augmented reality environment to indicate how objects can be positioned to properly load the vehicle.

In some examples disclosed herein, a mobile device (e.g., a smartphone, a headset, etc.) with a camera can be used to scan a vehicle to determine what objects are on/in the vehicle. In this example, the mobile device can detect a visual anchor on the vehicle to determine the position of identified objects relative to the visual anchor. As used herein, a visual anchor is a visually identifiable feature at a fixed location on a vehicle that can be used to reference the locations of objects in/on the vehicle. In other examples disclosed herein, a camera integral with the vehicle (e.g., a camera mounted above a bed of a truck) can be used to identify an object loaded in a specific area of the vehicle (e.g., a truck bed). In some examples, machine vision techniques can be used to identify objects. In some examples disclosed herein, the augmented reality environment can be displayed on a display integral with the vehicle. In other examples disclosed herein, the augmented reality environment can be presented on a display of the mobile device.

Some known vehicle monitoring systems monitor a load imparted on a vehicle hitch (sometimes referred to as tongue ball weight) by a trailer to inform a driver whether contents of the trailer are properly positioned thereon via a display of a smartphone or a display disposed in the vehicle. Other known vehicle monitoring systems monitor a weight of a vehicle and similarly inform, via the display(s), the driver whether the weight exceeds a weight limit of the vehicle. In this manner, the driver can load the trailer and/or the vehicle without assistance from another person. However, these known vehicle monitoring systems can impede the driver from properly loading the trailer and/or the vehicle by requiring the driver to frequently view a display.

Indicator apparatus and related methods for use with vehicles are disclosed herein. Examples disclosed herein assist a person (e.g., a driver, a passenger, vehicle servicer personnel, etc.) in properly loading a vehicle and/or a trailer associated therewith without aid from another person. Some disclosed examples provide an example vehicle controller (e.g., an electronic control unit (ECU)) communicatively coupled to an example light (e.g., a taillight, a headlight, a third brake light, side marker, etc.). In particular, the controller directs the light to generate predetermined visual indicators that inform the person when the trailer and/or the vehicle is properly loaded during a loading event. To determine a visual characteristic for the light, the example controller determines the load condition of the vehicle by comparing detected loads (e.g., loads corresponding to a tongue ball weight and/or a vehicle weight) associated with the vehicle to one or more example thresholds (e.g., values corresponding to a proportion of a trailer weight and/or a weight limit of the vehicle). Additionally, in some examples, the controller monitors loads for changes therein and, in response, changes or adjusts the visual characteristic of the light to facilitate load adjustments by the person.

In some disclosed examples, when loading the trailer, the controller determines an example load imparted on a hitch by a trailer tongue via one or more sensors (e.g., a load sensor operatively coupled to the hitch and/or a vehicle axle) and compares the load to an example threshold load (e.g., a predetermined and/or calculated value corresponding to a proportion (e.g., between about 10% and about 25%) of the trailer weight). Based on the comparison, the example controller generates, via the light, a predetermined visual indicator via to visually indicate to the person loading the trailer a load status (e.g., properly or improperly loaded) of the trailer and/or a degree to which weight of the trailer is improperly distributed.

In some examples, the controller enables the light to blink (i.e., activate and deactivate) at a predetermined rate or frequency based on the load condition and/or a magnitude of the load relative to a magnitude of the threshold load. In such examples, the frequency at which the light blinks can visually indicate the degree to which the trailer is improperly loaded or to indicate the relative magnitude of available weight remaining to reach the threshold magnitude.

As the person positions and/or adjusts contents on the trailer, the example controller changes or adjusts a visual characteristic of the example light based on a change in the load imparted on the hitch, thereby visually informing the person of a change in the trailer load and/or a distribution thereof. In this manner, disclosed examples visually indicate to the person whether the weight distribution of the trailer is improving. For example, the controller increases or decreases the frequency at which the light blinks in response to changes in the load. Additionally, in some examples, the controller can cause the light to cease blinking (e.g., maintain brightness thereof or deactivate) in response to the load satisfying the threshold load, which may visually indicate that the trailer is properly loaded for towing by the vehicle.

In some examples, to similarly indicate when the trailer is properly loaded and/or the degree to which the trailer is improperly loaded, the controller generates one or more predetermined colors. For example, a first predetermined color (e.g., red) may visually indicate the load imparted on the hitch is below the threshold load. In some examples, a second predetermined color (e.g., yellow) may visually indicate the load imparted on the hitch is proximate to the threshold load. In some examples, a third predetermined color (e.g., green) may visually indicate the load satisfies the threshold load (i.e., the trailer is properly loaded).

In such examples, as the person positions and/or adjusts the contents on the trailer, the controller enables the light to change between the predetermined colors in response to load changes. In particular, the controller can change the colors of the light in accordance with one or more predetermined color sequences (e.g., stored in a memory of the controller). For example, as the load approaches and satisfies the threshold load, the color of the light changes consecutively from red, to yellow, and then to green (i.e., a first example predetermined color sequence).

Further, some disclosed examples provide an example mobile device (e.g., a smartphone) communicatively coupled to the controller. In particular, the mobile device enables the person to remotely monitor the load imparted on the hitch when towing the trailer via the vehicle. More particularly, the controller directs the mobile device to generate a warning and/or a notification in response to the load not satisfying the threshold load (e.g., resulting from changes in trailer weight distribution).

In some disclosed examples, when loading the vehicle, the controller determines the load condition of the vehicle and/or a weight of the vehicle via one or more sensors (e.g., a load sensor operatively coupled to a vehicle axle, a ride height sensor, etc.) and compares the weight to an example threshold weight (e.g., a predetermined value corresponding to a weight limit of the vehicle). Based on the comparison, the example controller generates a predetermined visual indicator via the light to visually indicate to the person loading the vehicle a load status of the vehicle (e.g., properly or improperly loaded) and/or a degree to which the vehicle is loaded below or above a weight limit thereof.

In some examples, the controller generates one or more of the example predetermined colors via the light based on a magnitude of the detected weight relative to a magnitude of the threshold weight. For example, the first predetermined color (e.g., red) may visually indicate that the vehicle weight is at or above the weight limit. In some examples, the second predetermined color (e.g., yellow) may visually indicate that the vehicle weight is proximate to the weight limit. In some examples, the third predetermined color (e.g., green) may visually indicate that the vehicle weight is sufficiently below the weight limit. Further, in some examples, the controller enables at least a portion of the example light to blink (e.g., at a predetermined frequency) in response to the vehicle weight significantly exceeding the weight limit.

As the person increases or decreases weight carried by the vehicle, the example controller changes or adjusts a visual characteristic of the example light based on a change in the vehicle weight, thereby visually informing the person of a change in the vehicle load and/or a distribution thereof. In some examples, the controller enables the example light to change between generating the predetermined colors in accordance with one or more predetermined color sequence (e.g., stored in a memory of the controller). For example, as the vehicle weight approaches and exceeds the threshold weight, the color of the light changes consecutively from green, to yellow, and then to red (i.e., a second example predetermined color sequence).

In some disclosed examples, as discussed in greater detail below in connection with FIG. 7, the example light is implemented with multiple lights sources (e.g., light-emitting diodes (LEDs), light bulbs, etc.) that form visual patterns, which facilitate visual inspection by the person when loading the trailer and/or the vehicle. In particular, the example controller generates a predetermined visual pattern via the light based on a magnitude of the vehicle weight relative to the magnitude of the threshold weight. Similarly, in some examples, the controller generates the predetermined visual pattern based on the magnitude of the load imparted on the hitch relative to the magnitude of the threshold load.

Further, in such examples, the example controller enables the light sources to change between predetermined visual patterns in response to load changes. In some examples, the controller consecutively powers or activates the light sources. Conversely, in some examples, the controller can consecutively deactivate the light sources. In some examples, the controller enables at least some of the light sources to blink.

Additionally or alternatively, some disclosed examples provide audible indicators to similarly assist the person in loading the trailer and/or the vehicle. In particular, the controller directs a sound source (e.g., a horn, a transducer (sometimes referred to as a chime), etc.) of the vehicle to generate a predetermined audible indicator to inform the person when the trailer and/or the vehicle is/are properly loaded. For example, the controller can generate, at a predetermined rate or frequency, sound via the sound source. Stated differently, the example controller can periodically activate and deactivate the sound source. Further, in such examples, the controller changes or adjusts an audible characteristic of the sound based on detected load or weight changes. For example, the controller increases or decreases the frequency at which the sound source generates sound. In some examples, the controller ceases activating and deactivating the sound source (e.g., maintains a volume thereof or deactivates) in connection with satisfaction of an example threshold.

In addition or alternatively to indicating the above disclosed statuses of the trailer and/or the vehicle to the person, some disclosed examples visually and/or audibly indicate one or more other statuses of the vehicle. In such examples, which will be discussed in greater detail below, the vehicle controller similarly controls the example light and/or the example sound source based on sensor data corresponding to one or more other detected and/or measured parameters (e.g., a temperature, a fluid pressure, a volume or sound intensity (e.g., a decibel), a position of a motor and/or an actuator (e.g., associated with a vehicle window), an electrical current, a voltage, etc.) associated with the vehicle to visually indicate the same to a person external to the vehicle.

FIG. 1 illustrates an environment 100 of an example vehicle load manager 102 that can be used with an example vehicle 104 with which the examples disclosed herein can be implemented. The vehicle 104 includes one or more example wheel and suspension assemblies 105, one or more example weight sensor(s) 106, an example trailer hitch 109, an example trailer weight sensor 110, and an example camera 122. In some examples, the vehicle load manager 102 can output information to an example display 114 and/or output information to an example mobile device 120 via an example network 118. In the illustrated example, the vehicle 104 is a consumer automobile. In other examples, the vehicle 104 can be a commercial truck, a motorcycle, a motorized cart, an all-terrain vehicle, a bus, a motorized scooter, a locomotive, or any other vehicle.

The example vehicle load manager 102 enables the generation of an augmented reality environment to guide a user to properly load the vehicle 104. For example, the vehicle load manager 102 can receive information from sensors (e.g., the weight sensor(s) 106, the trailer weight sensor 110, etc.), process the data, and output an augmented reality environment (e.g., to the display 114 or an example display 124 of the mobile device 120). In some examples, the vehicle load manager 102 can additionally receive live video data from a camera of the mobile device 120 and/or the example camera 122. In some examples, the vehicle load manager 102 can further generate guidance to be presented to the user to instruct the user how to redistribute the load on the vehicle 104. The example camera 122 can be, for example, mounted in a center high mounted stop light (CHMSL) of the vehicle (e.g., the brake light indicator above the rear window of a truck bed, etc.).

In some examples, one or more of the wheel and suspension assemblies 105 can be coupled via an axle (e.g., a front axle, a rear axle, etc.). Additionally, one or more of the wheel and suspension assemblies 105 can include a weight sensor 106 (e.g., an axle load sensor). In some examples, the weight sensors 106 are ride height sensors that measure the compression of specific ones of the wheel and suspension assemblies 105 (e.g., a deflection of an elastic element of the wheel and suspension assembly 105), from which load information can be derived. In other examples, the weight sensors 106 can be transducers capable of converting load information into an electrical signal to be received by the vehicle load manager 102.

In the illustrated example, the vehicle 104 can tow a trailer coupled to the vehicle 104 via the trailer hitch 109. A trailer may exert a load on the vehicle 104, which can be measured by the example trailer weight sensor 110. In some examples, the trailer weight sensor 110 can be integrated into the trailer hitch 109. In some examples, the trailer weight sensor 110 is a force sensor (e.g., a magnetoelastic sensor, a load cell, a strain gauge, an accelerometer, etc.) capable of measuring forces and/or moments at the trailer hitch 109. In some examples, the trailer weight sensor 110 measures the load corresponding to the one or more loads exerted on the vehicle 104 by a towed trailer (e.g., total load of the trailer, tongue, etc.).

In some examples, the display 114 can present a user of the vehicle 104 with an augmented reality environment produced by the vehicle load manager 102. In these examples, the display 114 can display an augmented reality environment including one or more instructions, load conditions of the vehicle 104, and/or weight indications (e.g., how much load is applied to an axle or the wheel and suspension assembly 105).

In some examples, the vehicle load manager 102 is connected to the network 118. For example, the network 118 can be a WiFi network or a BlueTooth® network. In other examples, the network 118 can be implemented by any suitable wired and/or wireless network(s) including, for example, one or more data buses, one or more Local Area Networks (LANs), one or more wireless LANs, one or more cellular networks, one or more public networks, etc. The example network 118 enables the example vehicle load manager 102 to be in communication with devices external to the vehicle 104 (e.g., the mobile device 120). As used herein, the phrase "in communication," including variances thereof, encompasses direct communication and/or indirect communication through one or more intermediary components and does not require direct physical (e.g., wired) communication and/or constant communication but, rather, includes selective communication at periodic or aperiodic intervals, as well as one-time events.

In the illustrated example of FIG. 1, the example mobile device 120 includes a camera and an example display 124. The example mobile device 120 can be one of or a combination of a smart phone, a tablet, a smart watch, a VR/AR headset, smart glasses, etc. In the illustrated example, the mobile device 120 communicates with the vehicle load manager 102 via the network 118. In other examples, the mobile device 120 can be connected to the vehicle load manager 102 via a wired connection.

Figure 2:
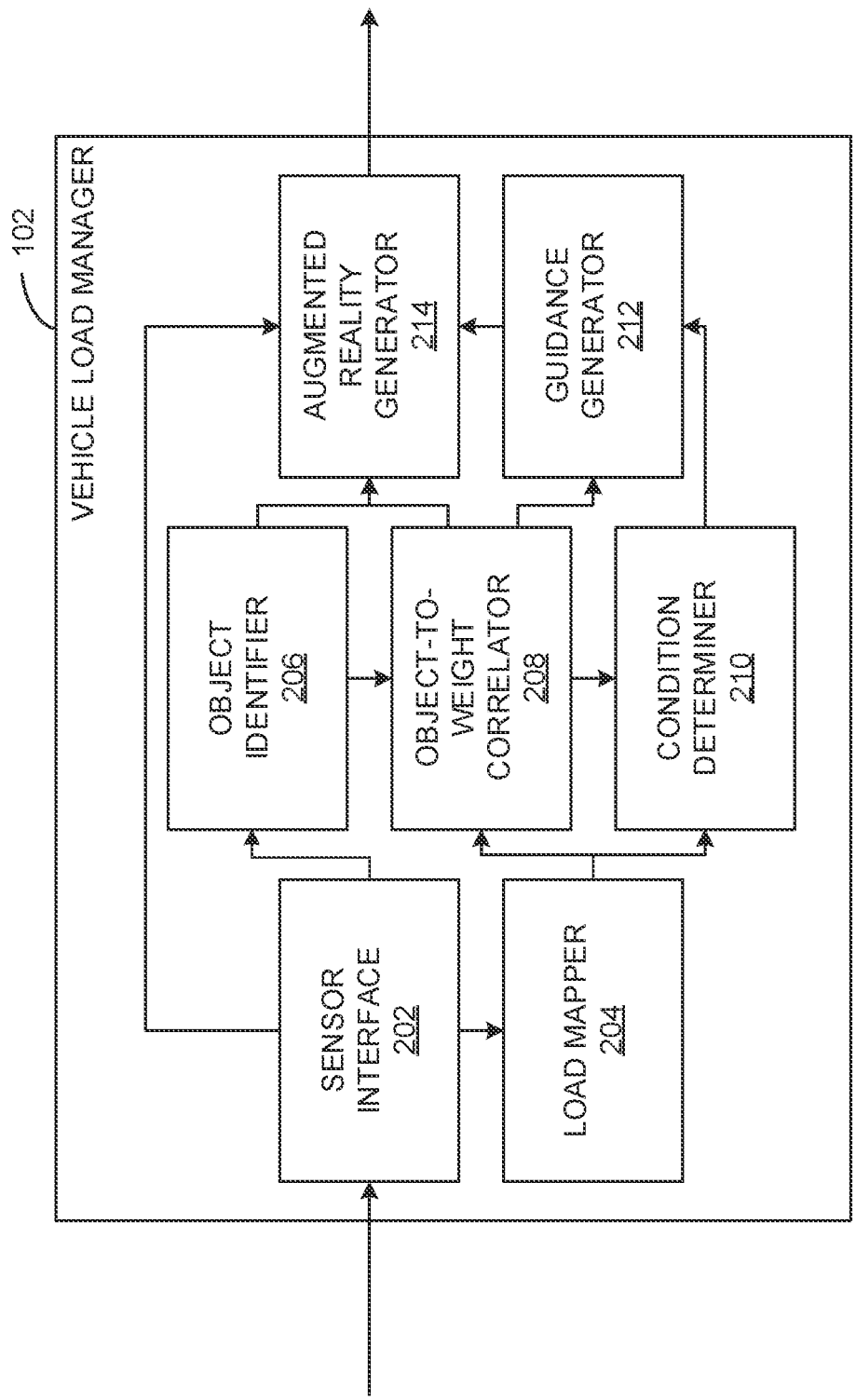
FIG. 2 is a block diagram depicting the vehicle load condition manager of FIG. 1.

FIG. 2 is a block diagram depicting the vehicle load manager 102 of FIG. 1. The example vehicle load manager 102 includes an example sensor interface 202, an example load mapper 204, an example object identifier 206, an example object-to-weight correlator 208, an example condition determiner 210, an example guidance generator 212 and an example augmented reality generator 214. The vehicle load manager 102 can be implemented fully on the vehicle 104, fully on the mobile device 120 or any combination thereof.

The example sensor interface 202 receives sensor data from the sensors of the example vehicle 104. For example, the sensor interface 202 can receive input from one or more of the example weight sensors 106 of FIG. 1, the example trailer weight sensor 110 of FIG. 1, and/or any other sensors (e.g., a fuel level sensor, an engine speed sensor, a vehicle speed sensor, etc.). In some examples, the sensor interface 202 can receive live video data from the mobile device 120. In some examples, the sensor interface 202 distributes received sensor data to at least one of the load mapper 204, the object identifier 206, and/or the augmented reality generator 214. For example, the sensor interface 202 can distribute load data (e.g., data received from the weight sensors 106 or trailer weight sensor 110) to the load mapper 204.

The example load mapper 204 determines a map of the loads on the vehicle 104. For example, the load mapper 204 can analyze the sensor data distributed by the sensor interface 202 to determine the location and weight of objects on/in the vehicle 104. For example, the load mapper 204 can analyze the sensor data to determine that an object weighing 85 pounds is placed on the passenger seat of the vehicle 104. In some examples, the load mapper 204 can generate a visual representation of the vehicle 104 with the additional loads on the vehicle 104.

The example object identifier 206 reviews the data distributed by the sensor interface 202 to determine the location of objects loading the vehicle 104. For example, the object identifier 206 can analyze live video data from the mobile device 120 and/or the camera 122 to visually identify an object on/in the vehicle 104. In some examples, the object identifier 206 can identify a visual anchor to create a reference point on the vehicle 104 to reference the location of the identified objects. In other examples, if the camera 122 is fixed to the vehicle 104, the object identifier 206 can compare the live video data to an image of the vehicle 104 without objects to identify objects in the live video data. In some examples, the object identifier 206 can use machine learning algorithms to identify and locate visual objects. In some examples, the object identifier 206 can use machine vision techniques (e.g., pattern recognition, edge detection, color detection, keypoint mapping, image histogram, etc.).

The example object-to-weight correlator 208 correlates the load map generated by the load mapper 204 to the objects identified by the object identifier 206. For example, the object-to-weight correlator 208 can associate a load in the bed of a vehicle 104 with an object identified by the object identifier 206 in the same location (e.g., tag the identified object with the corresponding load, etc.). In some examples, the object-to-weight correlator 208 can generate a map of shapes, loads, and positions of the object(s) on/in the vehicle 104 based on the load map and identified objects.

The example condition determiner 210 analyzes the load map generated by the load mapper 204 and/or sensor data for the sensor interface 202 to determine the load condition of the vehicle 104. For example, the condition determiner 210 can determine if the load map indicates that the vehicle 104 is overloaded. In other examples, the condition determiner 210 can determine if a GAWR of the vehicle 104 has been exceeded. In other examples, the condition determiner 210 can determine that vehicle 104 is not misloaded. In some examples, the condition determiner 210 can determine whether rearranging the objects on/in the vehicle 104 would alleviate an adverse load condition(s) of the vehicle 104.

The example guidance generator 212 generates instructions to redistribute loads on the vehicle 104 to improve the load condition of the vehicle 104. For example, the guidance generator 212 can determine that an object in the bed of the vehicle 104 should be moved to a different location in the bed to better distribute the load on the vehicle 104. In some examples, the guidance generator 212 can generate an instruction that indicates the location and/or direction the object should be moved to correct the loading condition. In some examples, the guidance generator 212 can generate an instruction to guide the user to remove objects on/in the vehicle 104. In other examples, if the vehicle 104 is properly loaded (e.g., not misloaded), the guidance generator 212 does not generate instructions. In some such examples, the guidance generator 212 can generate an indication that the vehicle 104 is properly loaded. In some examples, the guidance generator 212 can generate instructions even if the vehicle 104 is properly loaded.

The example augmented reality generator 214 generates an augmented reality environment based on the data received by the sensor interface 202, the object-to-weight correlator 208, and the guidance generator 212. The example augmented reality generator 214 generates an augmented reality environment to be presented via the display 114 and/or the mobile device 120. The augmented reality generator 214 can, for example, create a visual indication of the load on each of the wheel and suspension assemblies 105 and/or axles of the vehicle 104. In some examples, the augmented reality generator 214 can generate a warning if the vehicle 104 is misloaded. In some examples, the augmented reality generator 214 can present a guidance instruction based on the input from the guidance generator 212 (e.g., instructions 314 of FIG. 3, the instructions 410 of FIG. 4, etc.). In some examples, the augmented reality generator 214 can update the augmented reality environment in real-time as the objects in the vehicle 104 are moved by a user. In other examples, the augmented reality generator 214 can update the generated augmented reality environment periodically at a predetermined interval or in response to a request from a user.

While an example manner of implementing the vehicle load manager 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example sensor interface 202, the example load mapper 204, the example object identifier 206, the example object-to-weight correlator 208, the example condition determiner 210, the example guidance generator 212, the example augmented reality generator 214, and/or, more generally, the example vehicle load manager 102 of FIG. 3 may be implemented by hardware, software, firmware, and/or any combination of hardware, software, and/or firmware. Thus, for example, any of the example sensor interface 202, the example load mapper 204, the example object identifier 206, the example object-to-weight correlator 208, the example condition determiner 210, the example guidance generator 212, the example augmented reality generator 214, and/or, more generally, the example vehicle load manager 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example, sensor interface 202, the example load mapper 204, the example object identifier 206, the example object-to-weight correlator 208, the example condition determiner 210, the example guidance generator 212, the example augmented reality generator 214 is/are hereby expressly defined to include a non-transitory computer readable storage device or storage disk such as a memory, a digital versatile disk (DVD), a compact disk (CD), a Blu-ray disk, etc., including the software and/or firmware. Further still, the example vehicle load manager 102 of FIG. 1 may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
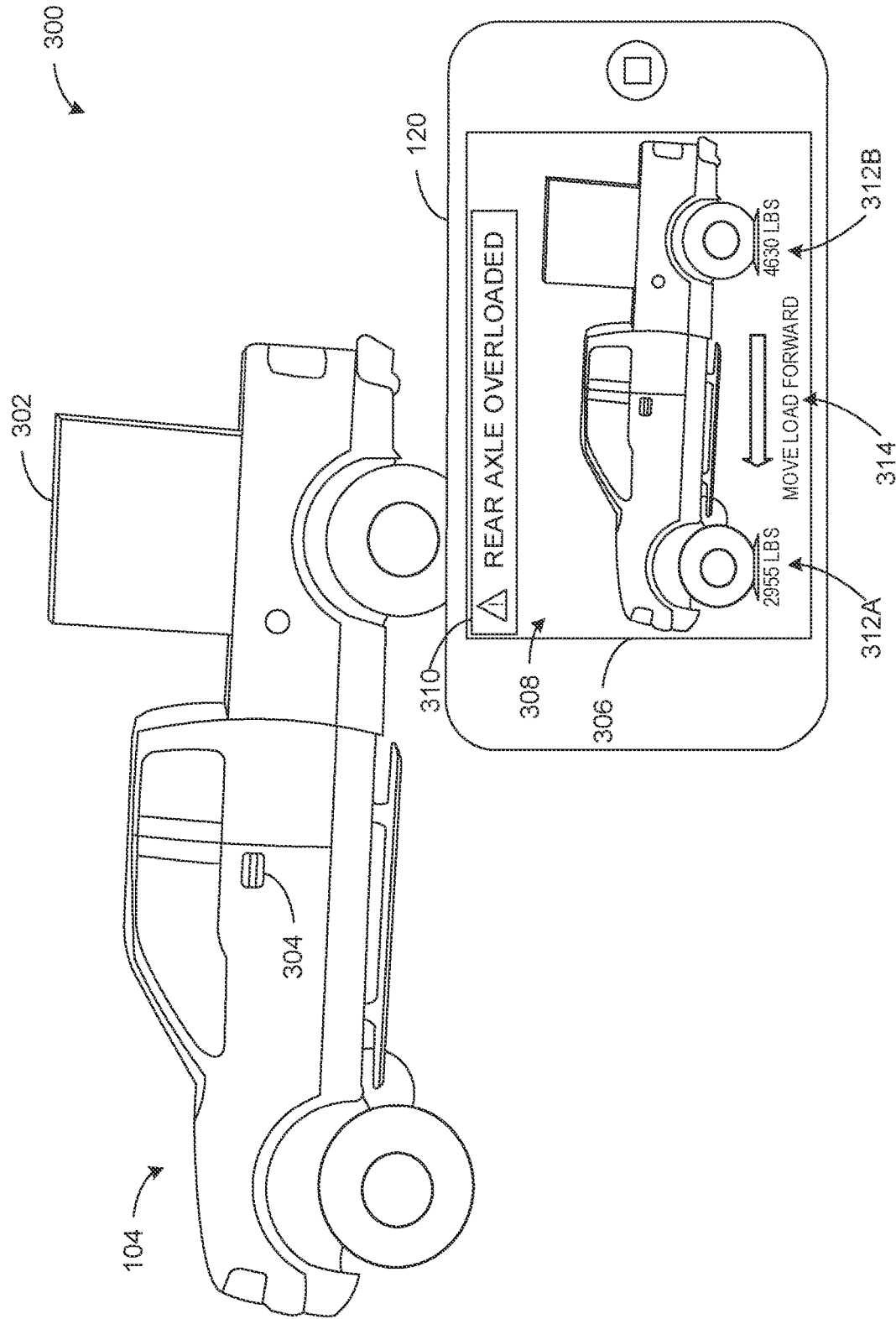
FIG. 3 is an example illustration of a vehicle and an example augmented reality environment generated by the vehicle load manager 102 of FIG. 1.

FIG. 3 is an example illustration 300 of the vehicle 104 including and an example augmented reality environment generated by the vehicle load manager 102. The example illustration 300 includes the example vehicle 104 of FIG. 1, an example object 302, and an example visual anchor 304. The example illustration 300 further includes the example mobile device 120 with an example display 306 displaying an example augmented reality environment 308 generated by the vehicle load manager 102. The example augmented reality environment 308 includes an example warning 310, an example front axle weight indicator 312A, an example rear axle weight indicator 312B and an example instruction 314. While an example of the graphical user interface of the augmented reality environment 308 is illustrated in FIG. 3, any other suitable graphical user interface may be used to represent the augmented reality environment 308 and/or the output of the vehicle load manager 102.

The example vehicle 104 is loaded by the object 302. In the illustrated example, the object 302 is loaded in the bed of the vehicle 104. In other examples, the object 302 may be on/in any other location of the vehicle 104. In the illustrated example, the load associated with the object 302 exceeds the GAWR of the rear axle of the vehicle 104, which causes the vehicle 104 to be misloaded. In some examples, the vehicle load manager 102 detects the location, shape, and load associated with the example object 302. In some examples, a camera associated with the mobile device 120 and/or the camera 122 scans the object 302 such that the vehicle load manager 102 can identify the object 302.

In the illustrated example, a user of the mobile device 120 scans the visual anchor 304 with the mobile device 120 (e.g., captures the visual anchor 304 in the video data generated by the mobile device 120) to allow the physical location(s) of the object 302 to be determined by the vehicle load manager 102. In the illustrated example, the visual anchor 304 is a handle of a front driver door of the vehicle 104. In other examples, the visual anchor 304 may be any other visually identifiable feature of the vehicle 104 (e.g., a hubcap, the fuel door, etc.). In some examples, the visual anchor 304 may be a sticker and/or other visual feature placed on the vehicle 104 by a user. In some examples, if the visual anchor 304 is not detected by the mobile device 120, the augmented reality environment 308 can include an instruction to the user to continue scanning the vehicle 104 until the visual anchor 304 is identified by the vehicle load manager 102. In the illustrated example, the vehicle 104 includes only the visual anchor 304. In other examples, the vehicle 104 can include any number of anchors in addition to the visual anchor 304.

In the illustrated example, the augmented reality environment 308 is generated based on live video data captured by a camera of the mobile device 120 with the output of the vehicle load manager 102. That is, as the live video data is presented via the display of the mobile device 120, the live video data is being augmented by the vehicle load manager 102. In some examples, the augmented reality environment 308 is updated in real time based on the video data captured by the mobile device 120 and changes to the load condition of the vehicle 104 (e.g., caused by a user adjusting the position of the object 302, etc.).

In the illustrated example of FIG. 3, the warning 310 includes the text the "rear axle overloaded," indicating a GAWR of the rear axle has been exceeded. In some examples, the warning 310 can illustrate the output of the condition determiner 210. In other examples, the warning 310 may represent any other potentially adverse loading condition(s) of the vehicle 104 (e.g., the front axle is overload, the load is unbalanced, etc.). In other examples where there is no adverse loading condition on the vehicle 104, the warning 310 may be absent. In this example, the augmented reality environment 308 may further include an indication that the vehicle 104 is properly loaded.

In the illustrated example of FIG. 3, the front axle weight indicator 312A is a rectangle underneath the front axle of the vehicle 104 in the augmented reality environment 308 and indicates the front axle is loaded with 2,955 lbs. Similarly, in the illustrated example, the rear axle weight indicator 312B is a rectangle underneath the rear axle of the vehicle 104 in the augmented reality environment 308 and indicates the rear axle is loaded with 4,630 lbs. In other examples, the front axle weight indicators 312A and the rear axle weight indicator 312B can be placed in any suitable location in the augmented reality environment 308 to indicate the load on the front and/or rear axles. In other examples, the front axle weight indicator 312A and/or the rear axle weight indicator 312B may include an audio notification to the user. In some examples, each wheel and suspension assembly 105 can have individual weight indicators (e.g., an indicator for the forward driver wheel and suspension assembly 105, an indicator for the forward passenger wheel and suspension assembly 105, etc.).

In the illustrated example, the instruction 314 includes the text "move load forward" and an arrow pointing to the front of the vehicle 104. In other examples, the instruction 314 can be in any other suitable location to indicate that the object 302 should be moved forward relative to the vehicle 104. In some examples, the instruction 314 can include a specific distance and direction to move the object 302. In some examples, the instruction 314 does not include text. In some examples, the instruction 314 may include any other visual representation to indicate how the load on the vehicle 104 should be redistributed (e.g., a line, a visual representation of the object 302 in the correct location, etc.). In some examples, the instruction 314 may include a non-visual notification to the user (e.g., an audio notification, a vibration, etc.).

Figure 4:
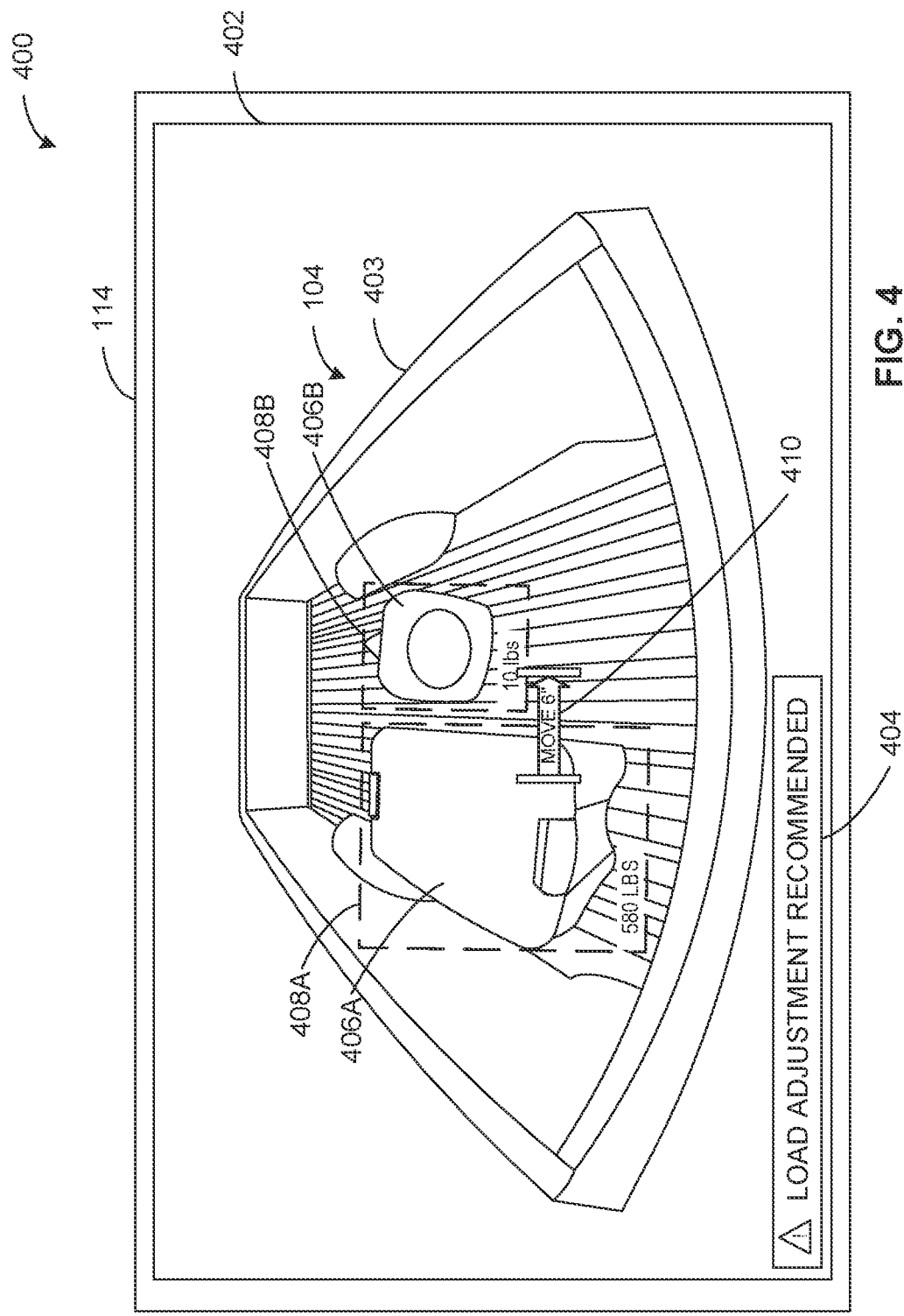
FIG. 4 is another example illustration of a vehicle and an example augmented reality environment generated by the vehicle load manager 102 of FIG. 1.

FIG. 4 is another example illustration 400 of the vehicle 104 and an example augmented reality environment 402 generated by the vehicle load manager 102 of FIG. 1. In the illustrated example, the augmented reality environment 402 is displayed via the display 114 of FIG. 1 and is generated based on the output the vehicle load manager 102 and live video data gathered by the camera 122 of FIG. 1. That is, as the live video data is presented via the display of the display 114, the live video data is being augmented by vehicle load manager 102. The example vehicle 104 further includes an example bed 403 holding an example first object 406A and an example second object 406B. The augmented reality environment 402 includes an example first weight indication 408A, an example second weight indication 408B, an example warning 404, and example instructions 410. In some examples, the augmented reality environment 402 is updated in real time based on the live video data captured by the camera 122 and changes in the load condition of the bed 403 (e.g., caused by a user adjusting the positions of the first object 406A and/or the second object 406B, etc.).

In the illustrated example, the first object 406A is a portable cooler and the second object 406B is a traffic cone. In other examples, the first object 406A and the second object 406B can be any other objects. In some examples, the vehicle load manager 102 of FIG. 1 can determine the load, shape, and position associated with both the first object 406A and the second object 406B. In the illustrated example, the vehicle load manager 102 determines that the vehicle 104 is unbalanced and that the first object 406A should be moved to properly balance the vehicle 104.

In some examples, the warning 404 can display the output of the condition determiner 210 of FIG. 2. In the illustrated example of FIG. 4, the warning 404 includes the text "load adjustment recommended," which indicates the vehicle 104 is unbalanced. In other examples, the warning 404 can indicate any other potentially adverse loading condition(s) of the vehicle 104 (e.g., the front axle is overloaded, etc.). In other examples where there is no adverse loading condition on the vehicle 104, the warning 404 may not be present in the augmented reality environment 402. In this example, the augmented reality environment 402 can further display indication that the vehicle 104 is properly loaded.

In the illustrated example, the instructions 410 is an arrow pointing to the right with respect to the display 114 including the text "move 6" indicating the first object 406A is to be moved 6 inches to the right on the vehicle 104 to properly balance the vehicle 104. In other examples, the instructions 410 can be in any suitable location and can include any suitable text and/or visual representation (e.g., a line, a visual representation of the first object 406A in the correct location, etc.). In some examples, the instructions 410 can include a non-visual notification to the user (e.g., an audio notification, a vibration, etc.). In some examples, the instructions 410 can include multiple steps (e.g., moving both the first object 406A and the second object 406B).

Figure 5:
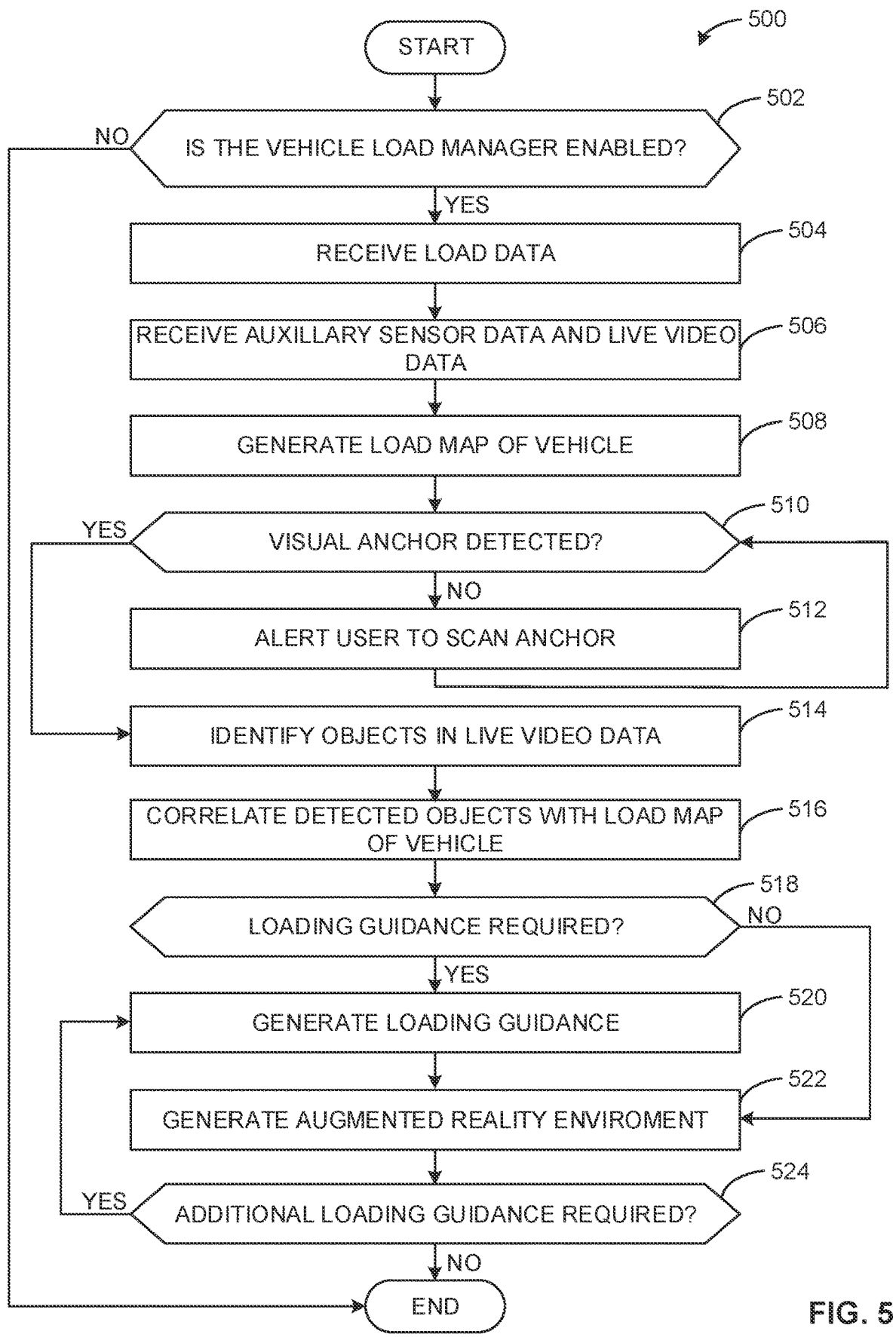
FIG. 5 is a flowchart representative of machine readable instructions that may be executed to implement the vehicle load condition manager of FIG. 1.

A flowchart representative of example methods, hardware implemented state machines, and/or any combination thereof for implementing the vehicle load manager 102 of FIG. 2 is shown in FIG. 5. The method can be implemented using machine readable instructions that may be an executable program or portion of an executable program for execution by a computer processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 5, many other methods of implementing the example vehicle load manager 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc4.) structured to perform the corresponding operation without executing software or firmware.

As mentioned above, the example method of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The method 500 of FIG. 5 begins at block 502. At block 502, if the vehicle load manager 102 is enabled, the method 500 advances to block 504. If the augmented vehicle load manager 102 is not enabled, the method 500 ends. For example, the vehicle load manager 102 can be enabled by a user. In other examples, the vehicle load manager 102 can automatically become enabled if the vehicle 104 is misloaded.

At block 504, the sensor interface 202 receives load data. For example, the sensor interface 202 can interface with one or more of the weight sensor(s) 106 associated with the wheel and suspension assemblies 105 of the vehicle 104. In some examples, the sensor interface 202 can further receive load data from the trailer weight sensor 110 and/or any other load sensors of the vehicles (e.g., load sensors associated with the seats of the vehicle 104). In some examples, the sensor interface 202 can convert the received load data into a format (e.g., a digital signal, a bit-based value, etc.) processable by the vehicle load manager 102. In some examples, the sensor interface 202 can distribute the received load data to any other elements of the vehicle load manager 102 (e.g., load mapper 204, the object identifier 206, etc.).

At block 506, the sensor interface 202 receives auxiliary sensor data and video data. For example, the sensor interface 202 can receive data from any other sensors on the vehicle 104 necessary to generate a load map of the vehicle (e.g., a fuel level sensor, etc.). In some examples, the sensor interface 202 can convert the received load(s) into a format processable by the vehicle load manager 102. In some examples, the sensor interface 202 can receive live video data generated by the mobile device 120 and/or the camera 122. In some examples, the sensor interface 202 can distribute the received auxiliary data and/or live video data to any other components of the vehicle load manager 102 (e.g., load mapper 204, the object identifier 206, etc.). In some examples, the live video data captures a visual anchor (e.g., the visual anchor 304 of FIG. 3) and/or one or more objects in/on the vehicle 104.

At block 508, the load mapper 204 generates a load map of the vehicle 104. For example, the load mapper 204 can analyze the load data distributed by the sensor interface 202 to generate a map of loads on the vehicle 104. In some examples, the load mapper 204 can generate a visual representation of the loads on the vehicle 104. At block 510, if the object identifier 206 identifies an anchor (e.g., the visual anchor 304 of FIG. 3) on the vehicle 104 captured in the live video data, the method 500 advances to block 514. If an anchor is not identified by the object identifier 206, the method 500 advances to block 512.

At block 512, the object identifier 206 alerts the user to scan an anchor of the vehicle 104. For example, the object identifier 206 can generate an alert to be displayed (e.g., on a display of the mobile device 120, the display 114, etc.). In some examples, the object identifier 206 can augment the live video data to include an indication to scan a visual anchor on the live video data. In some examples, the object identifier 206 can issue a non-visual alert to the user (e.g., vibrating the mobile device, an audible message, etc.). For example, the object identifier 206 may alert the user to reposition the camera generating the live video data to better capture the visual anchor 304.

At block 514, the object identifier 206 identifies objects in the live video data. For example, the object identifier 206 can process the live video data received by the sensor interface 202 to identify objects on/in the vehicle 104. In some examples, the object identifier 206 can identify the locations of identified objects relative to the visual anchor 304.

At block 516, the object-to-weight correlator 208 correlates the detected objects with the load map. For example, the object-to-weight correlator 208 can associated identified objects (e.g., identified by the object identifier 206) with the load map (e.g., generated by the load mapper 204) in a nearby position. In some examples, the object-to-weight correlator 208 generates a visual map of the load, shape, and position of objects on/in the vehicle 104.

At block 518, the condition determiner 210 determines if loading guidance is required. For example, the condition determiner 210 can determine if the vehicle 104 is misloaded. In some examples, condition determiner 210 can determine if the vehicle 104 is not optimally loaded. In some examples, the condition determiner 210 can transmit the determined condition to the augmented reality generator 214. If the condition determiner 210 determines that loading guidance is required, the method 500 advances to block 520. If the condition determiner 210 determines that loading guidance is not needed, the method 500 advances to block 520.

At block 520, the guidance generator 212 generates loading guidance. For example, the guidance generator 212 can determine that the objects in and/or on the vehicle 104 should be rearranged to correctly load the vehicle 104. In some examples, the guidance generator 212 can determine that objects should be removed from the vehicle 104. In some examples, the guidance generator 212 can indicate the location and distance a specific object in/on the vehicle 104 should be moved to alleviate adverse loading conditions. Additionally or alternatively, the guidance generator 212 can generate a visual representation (e.g., an arrow including text) indicating how one or more objects should be rearranged on the vehicle 104.

At block 522, the augmented reality generator 214 generates an augmented reality environment. For example, the augmented reality generator 214 can combine the visual map generated by the object-to-weight correlator 208 with the live video data (e.g., presented on the mobile device 120 and/or the camera 122). In some examples, the augmented reality generator 214 can generate weight indicators to identify the weight of objects on/in the vehicle 104 (e.g., the weight indicators 408A and 408B of FIG. 4). In some examples, the augmented reality generator 214 can generate an indication of a load carried by the front axle or rear axle of the vehicle 104 (e.g., the weight indicators 312A and 312B). In some examples, the augmented reality generator 214 can generate an indication of the load carried by each of the wheel and suspension assemblies 105 of FIG. 1.

At block 524, the condition determiner 210 determines if additional loading guidance is required. For example, the condition determiner 210 can evaluate a new map generated by the object-to-weight correlator 208 to determine if the vehicle 104 is misloaded. In other examples, the condition determiner can process the live video data to determine if a user has followed the guidance generated by the guidance generator 212. If the loading condition has been resolved, the method 500 ends. If additional loading guidance is required, the method 500 returns to block 522 to generate new loading guidance.

Figure 6:
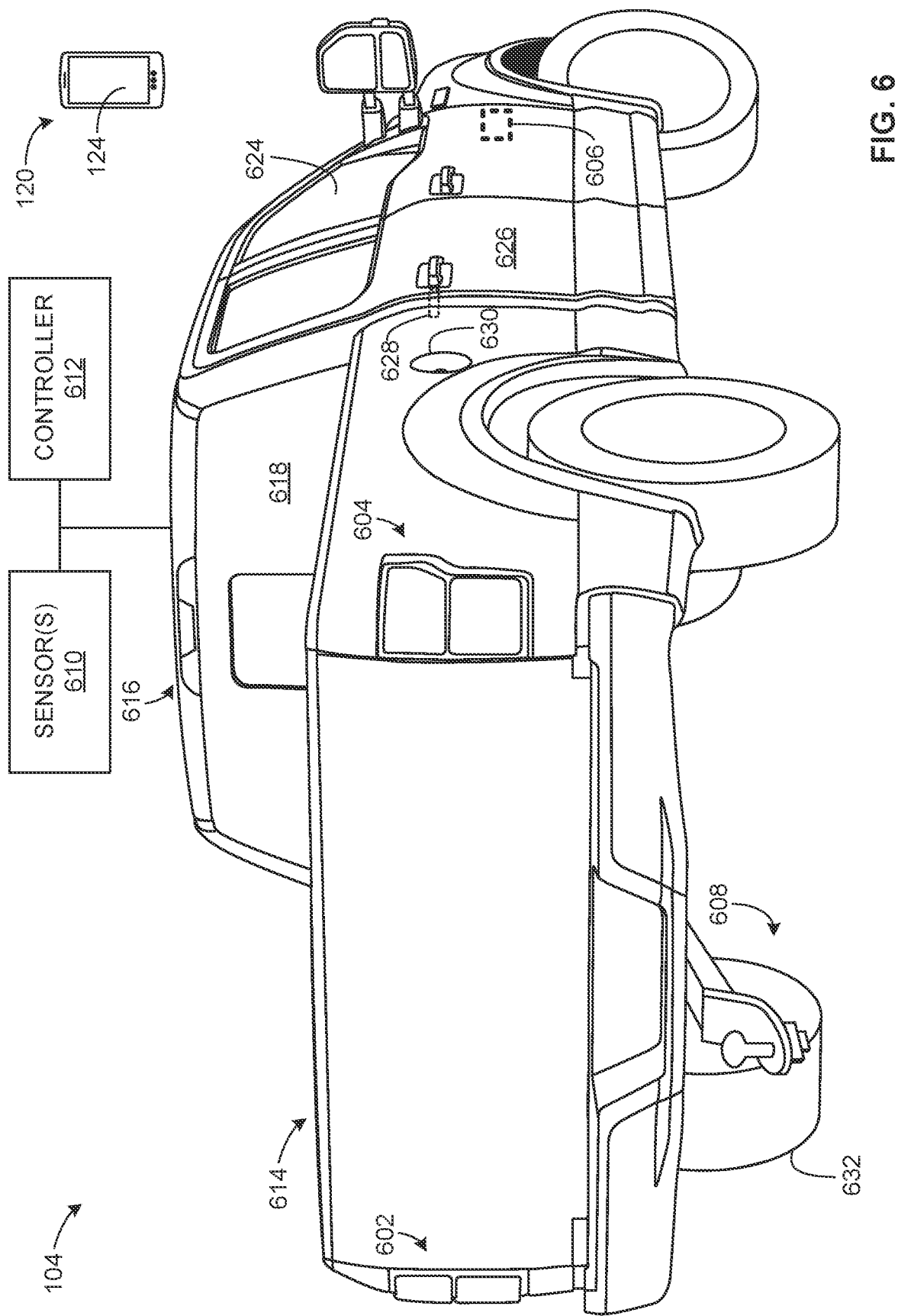
FIG. 6 is a rear view of the vehicle of FIG. 1.

FIG. 6 is a rear view of the first vehicle 104 of FIG. 1. The example first vehicle 104 includes one or more example vehicle lights (e.g., headlights, taillights, etc.) 602, 604 (i.e., a first example vehicle light 602 and a second example vehicle light 604), an example horn 606, an example hitch 608, one or more example sensors 610, and an example vehicle controller 612.

In some examples, to implement towing for the first vehicle 104, the example hitch 608 is coupled to the first vehicle 104. In particular, the hitch 608 of FIG. 1 is to receive and/or movably couple to at least a portion of a trailer (e.g., a trailer tongue), as discussed further below in connection with FIGS. 9A and 9B. While the example of FIG. 6 depicts the hitch 608 as being a drawbar hitch (sometimes referred to as a bumper pull hitch), in other examples, the first vehicle 104 may be implemented with any other suitable hitch such as, for example, a weight distributing hitch, a fifth wheel hitch, a gooseneck hitch, etc. Accordingly, in some examples, the hitch 608 may be disposed on a different portion of the first vehicle 104 such as in a vehicle bed 614.

The example controller 612 detects and/or monitors a load imparted on and/or associated with the hitch 608 via the sensor(s) 610 during a trailer loading event and, in response, controls one or more of the example lights 602, 604 to visually assist a person in loading a trailer associated with the first vehicle 104. Additionally or alternatively, in some examples, the example controller 612 detects and/or monitors a weight in the bed 614 of the first vehicle 104 via the sensor(s) 610 during a vehicle loading event and, in response, controls one or more of the example lights 602, 604 to visually assist a person in loading the first vehicle 104. Further, in some examples, the controller 612 can similarly control the horn 606 and/or one or more other sound sources during a loading event to audibly assist a person.

In some examples, the example controller 612 detects and/or monitors one or more other parameters associated with the first vehicle 104 via the sensor(s) 610 in addition or alternatively to the hitch load and/or the vehicle weight, as discussed further below. In such examples, the controller 612 similarly controls one or more of the example lights 602, 604 based on data received from the sensor(s) 610.

The controller 612 of the illustrated example can be implemented, for example, using an electronic control unit (ECU). As such, the controller 612 of FIG. 1 is communicatively coupled to one or more of the lights 602, 604, the horn 606, and/or the sensor(s) 610, for example, via one or more signal transmission wires or busses, radio frequency, etc. Additionally or alternatively, the controller 612 can implement or be implemented by the vehicle load manager 102 of FIGS. 1 and 2.

To measure and/or detect a load associated with first vehicle 104, the sensor(s) 610 of FIG. 6 can include, but is/are not limited to, a force or load sensor (e.g., operatively coupled to a vehicle axle and/or the hitch 608), a strain gauge (e.g., operatively coupled to a vehicle axle and/or the hitch 608), a ride height sensor, and/or a tire pressure sensor (e.g., associated with a tire pressure monitoring system (TPMS)). In some examples, the controller 612 detects, via the sensor(s) 610, one or more loads corresponding to a tongue ball weight. In some examples, the controller 612 detects, via the sensor(s) 610, one or more loads corresponding to a weight of the first vehicle 104. Further, in some examples, to enable the controller 612 to measure and/or detect one or more other vehicle parameters, the sensor(s) 610 of FIG. 6 can include, but is/are not limited to, a temperature sensor, a current sensor, a voltage sensor, a potentiometer, an optical sensor (e.g., a camera), and/or a distance or proximity sensor (e.g., an ultrasonic sensor, an infrared sensor, etc.).

While the example of FIG. 6, depicts the first example light 602 and the second example light 604 as being taillights, in other examples, the first light 602 and/or the second light 604 may correspond to a different external light of the first vehicle 104 to provide a visual indication to a person external to the first vehicle 104 such as, for example, a headlight, a side marker, etc. For example, as shown in the illustrated example of FIG. 6, the controller 612 can communicate with and/or control an example third vehicle light 616 (sometimes referred to as a third brake light), which is disposed proximate an example windshield (e.g., a rear windshield) 618 of the first vehicle 104.

Further, in some examples, the controller 612 controls one or more lights that are separate from components of the first vehicle 104 such as, for example, multiple light-emitting diodes disposed externally relative to the first vehicle 104. Thus, examples disclosed herein may be implemented using one or more of the lights 602, 604, 616 of the first vehicle 104 and/or one or more lights separate from the first vehicle 104.

In some examples, to enable a person to monitor remotely a status of the first vehicle 104 and/or a trailer associated therewith, the example controller 612 communicates with the mobile device 120 such as, for example, a smartphone. In particular, the display 124 of the mobile device 120 generates images for viewing by a user and/or a speaker or transducer to generate sound. The example mobile device 120 also includes one or more input devices (e.g., a touch screen, a keyboard, a microphone, etc.) to receive user input and/or data.

Additionally or alternatively, in some examples, the controller 612 enables the light(s) 602, 604, 616 to visually indicate one or more other statuses of the first vehicle 104, which may aid a person outside of the vehicle 104. In some examples, the controller 612 enables the light(s) 602, 604, 616 to visually indicate whether an example window (e.g., a passenger and/or a driver window) 624 of the first vehicle 104 is open, closed, and/or a degree to which the window 624 is open. In some examples, the controller 612 enables the light(s) 602, 604, 616 to visually indicate whether an example door (e.g., a passenger and/or a driver door) 626 of the first vehicle 104 is open or closed. In some examples, the controller 612 enables the light(s) 602, 604, 616 to visually indicate whether an example lock (e.g., an electronic or power door lock) 628 operatively coupled to the door 626 is locked or unlocked. In some examples, the controller 612 enables the light(s) 602, 604, 616 to visually indicate whether a fuel door 630 of the first vehicle 104 is open or closed. In some examples, the controller 612 enables the light(s) 602, 604, 616 to visually indicate whether a fuel tank of the first vehicle 104 is properly filled and/or a degree to which the fuel tank is filled. In some examples, the controller 612 enables the light(s) 602, 604, 616 to visually indicate whether an example tire (e.g., a left and/or a rear tire) 632 of the first vehicle 104 is properly filled or inflated and/or a degree to which the tire 632 is inflated. In some examples, the controller 612 enables the light(s) 602, 604, 616 to visually indicate an electrical power level of a battery (e.g., a 12-volt battery) of the first vehicle 104. In some examples, the controller 612 enables the light(s) 602, 604, 616 to visually indicate an electrical power level of a generator of the vehicle. In some examples, the controller 612 enables the light(s) 602, 604, 616 to visually indicate a temperature of an engine of the first vehicle 104. In some examples, the controller 612 enables the light(s) 602, 604, 616 to visually indicate a temperature of a fluid (e.g., oil) in the engine. In some examples, the controller 612 enables the light(s) 602, 604, 616 to visually indicate a temperature of another fluid (e.g., air) in a cabin of the first vehicle 104.

In some such examples, the controller 612 implements control of the light(s) 602, 604, 616 in response to user input to, for example, the example mobile device 120, an electronic device disposed in the first vehicle 104, one or more buttons and/or switches disposed in the first vehicle 104, an electronic key fob communicatively coupled to the controller 612, etc. For example, a person activates or initiates a setting of the controller 612 and/or the first vehicle 104, thereby enabling the controller 612 to detect and/or monitor (e.g., continuously or repeatedly) the one or more parameters associated with the first vehicle 104 and/or control the light(s) 602, 604, 616.

Figure 7:
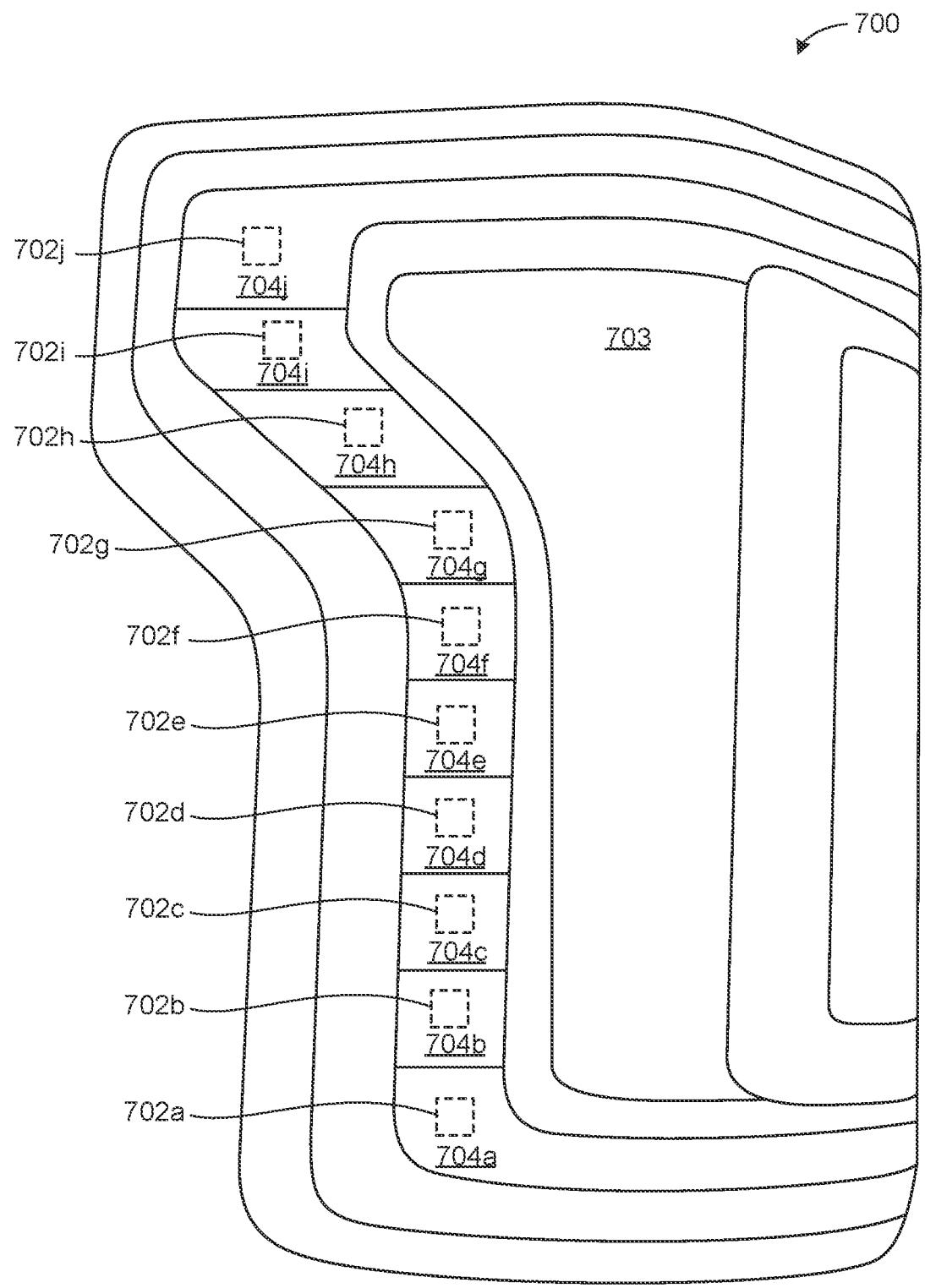
FIG. 7 is a view of an example light in accordance with examples disclosed herein.

FIG. 7 is a detailed view of an example fourth light 700 in accordance with examples disclosed herein. In some examples, the example fourth light 700 of the illustrated example corresponds to one or more lights of the aforementioned first vehicle 104 of FIGS. 1 and 6 such as, for example, the example first light 602, the example second light 604, and/or the example third light 616. According to the illustrated example of FIG. 7, the fourth light 700 includes multiple light-emitting diodes (LEDs) 702$a$-$j$, ten of which are shown in this example. In this example, the LEDs 702$a$-$j$ are disposed behind a lens 703 of the light 700. In particular, the LEDs 702$a$-$j$ of the illustrated example illuminate different portions or areas 704$a$-$j$ of the fourth light 700, thereby forming a visual pattern to facilitate visual inspection of the fourth light 700 by a person.

As shown in FIG. 7, the LEDs 702$a$-$j$ of the illustrated example extend along a substantially vertical direction. However, in other examples, the LEDs 702$a$-$j$ may have any other suitable orientation. For example, the LEDs 702$a$-$j$ may extend along a substantially horizontal direction and/or a curved path. Further, while the example LEDs 702$a$-$j$ of FIG. 2 form a substantially rectangular array (e.g., having one column and ten rows), in other examples, the LEDs a-j may form an array that is larger, smaller, and/or shaped differently.

In some examples, the visual pattern formed by the LEDs 702$a$-$j$ is predetermined and/or changes, for example, based on commands and/or power provided from the aforementioned controller 612. In such examples, the controller 612 can change or adjust one or more visual characteristics of the pattern (e.g., in response to parameter changes measured by the example sensor(s) 610), as discussed further below in connection with FIGS. 9A, 9B, 10A, and 10B. For example, the controller 612 enables at least some of the LEDs 702$a$-$j$ to blink (i.e., activate and deactivate). In some examples, the controller 612 enables at least some of the LEDs 702$a$-$j$ to change color and/or intensity or brightness. In some examples, the controller 612 consecutively activates and/or deactivates the LEDs 702$a$-$j$ in accordance with one or more predetermined sequences (e.g., stored in a memory of the controller 612). While the example of FIG. 7 depicts the example fourth light 700 as being implemented with the LEDs 702$a$-$j$, in other examples, the fourth light 700 may be implemented using one or more other suitable light sources (e.g., one or more incandescent lights, fluorescent lights, etc.). Further, in some examples, the example LEDs 702$a$-$j$ may be disposed on the first vehicle 104 (e.g., on an exterior surface of the first vehicle 104, behind the windshield 618, etc.).

Figure 8:
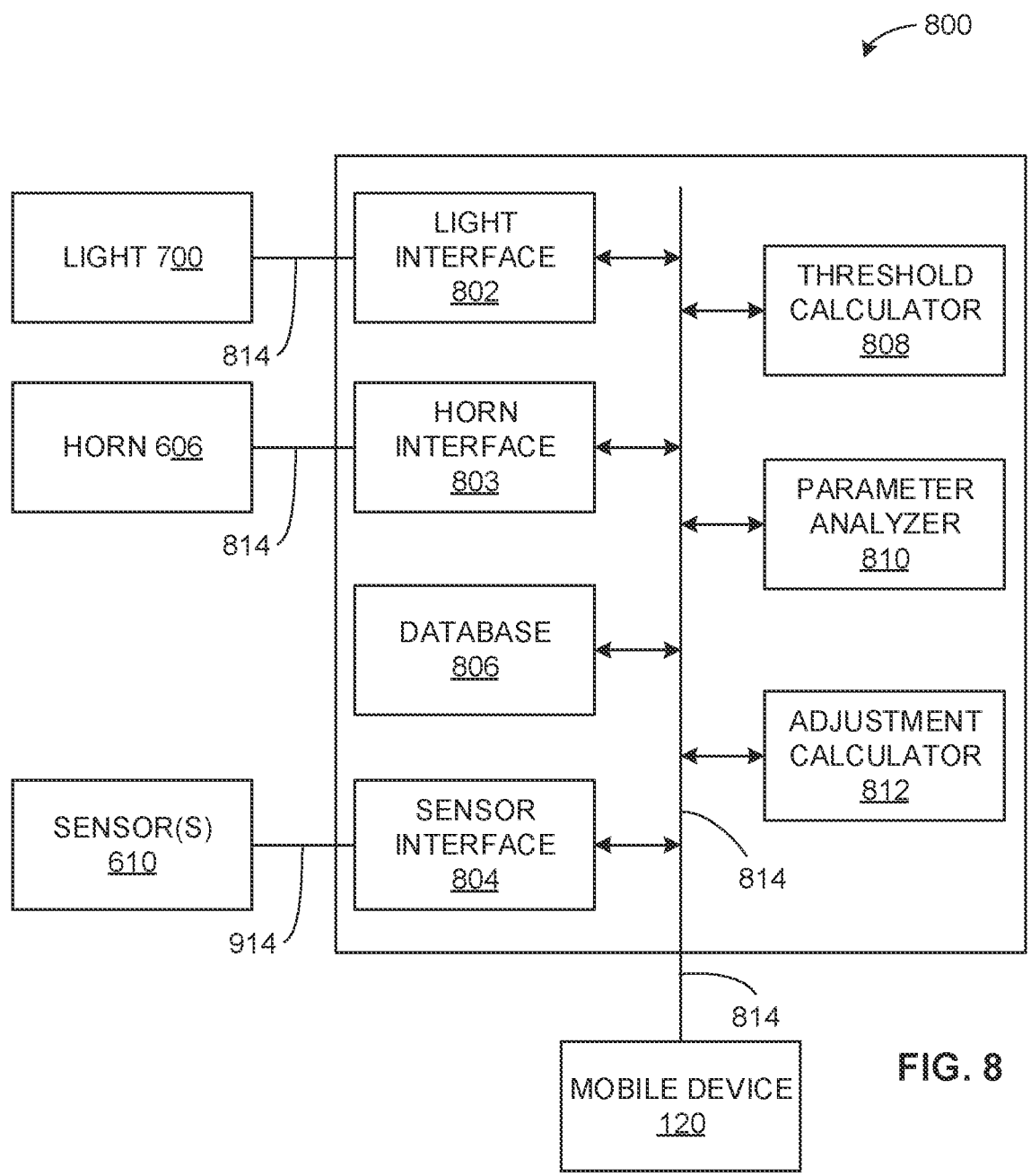
FIG. 8 is a block diagram of an example indicator system in accordance with the teachings of this disclosure.

FIG. 8 is a block diagram of an example indicator system 800 in accordance with the teachings of this disclosure. The example indicator system 800 of FIG. 8 can be implemented by the example controller 612 of FIG. 6 and/or the vehicle load manager 102 of FIG. 1. The example indicator system 800 of FIG. 8 includes a light interface 802, a horn interface 803, a sensor interface 804, a database 806, a threshold calculator 808, a parameter analyzer 810, and an adjustment calculator 812. In the example of FIG. 8, the vehicle indicator system 800 is communicatively coupled to the example mobile device 120 of FIGS. 1 and 6, the sensor(s) 610 of FIG. 6, the horn 606 of FIG. 6, and the example fourth light 700 disclosed above in connection with FIG. 7 via communication link(s) 814 such as, for example, one or more signal transmission wires or busses, radio frequency, etc. In particular, the example light interface 802 provides control or command signals and/or power to the fourth light 700 to generate light and/or illuminate one or more of the portions 704a-j thereof. Similarly, in some examples the example horn interface 803 provides control or command signals and/or power to the horn 606 to generate sound.

In some examples, to assist a person in loading a vehicle and/or a trailer, the example indicator system 800 directs the example fourth light 700 to control light generated thereby. Additionally or alternatively, in some examples, the example indicator system 800 directs the example horn 606 and/or one or more other sound sources to control sound generated thereby. In particular, during a loading event, the indicator system 800 of the illustrated example generates one or more predetermined visual indicators via the fourth light 700 and/or one or more predetermined audible indicators via the horn 606 based on sensor data corresponding to a load associated with the first vehicle 104. Further, in some examples, the indicator system 800 similarly controls the fourth light 700 based on sensor data corresponding to one or more other parameters associated with the first vehicle 104 to visually indicate the same to a person external to the first vehicle 104.

In some examples, the indicator system 800 enables the fourth light 700 to blink (i.e., activate and deactivate) at predetermined rates or frequencies (e.g., 1 hertz, 5 hertz, 10 hertz, etc.), generate predetermined colors (e.g., red, yellow, green, etc.), generate light having a predetermined brightness (e.g., 50 lumens, 200 lumens, 500 lumens, etc. In some examples, the indicator system 800 enables the horn 606 to activate and deactivate at predetermined rates or frequencies, generate sound having a predetermined pitch (e.g., 200 hertz, 1,000 hertz, 5,000 hertz, etc.), generate sound at a predetermined volume (e.g., 50 decibels, 75 decibels, 90 decibels, etc.), etc.

Further, in some examples, the predetermined visual indicator includes a visual pattern. For example, the indicator system 800 enables the fourth light 700 to generate one or more predetermined patterns (e.g., stored in the database 806) via the aforementioned LEDs 702a-j based on sensor data. Accordingly, the example light interface 802 of FIG. 8 is communicatively and/or operatively coupled to the fourth light 700 via the communication link(s) 814, and the example horn interface 803 is communicatively and/or operatively coupled to the horn 606 via the communication link(s) 814.

In the illustrated example of FIG. 8, the sensor interface 804 is communicatively coupled to the example sensor(s) 610 via the communication link(s) 814 to receive data therefrom. In some examples, the sensor(s) 610 generate data corresponding to a load associated with the hitch 608 and/or a change in the load and provide the data to the sensor interface 804. In some examples, the sensor(s) 610 generate data corresponding to a weight and/or a change in the weight of the first vehicle 104 and provide the data to the sensor interface 804. In some examples, the sensor(s) 610 generate data corresponding to one or more other parameters (e.g., a temperature, a fluid pressure, a sound intensity (e.g., a decibel), a position of a motor and/or an actuator (e.g., associated with a vehicle window), an electrical current, a voltage, etc.) associated with the first vehicle 104.

To determine whether to adjust one or more characteristics of the fourth light 700 and/or the horn 606 (e.g., during a loading event), the parameter analyzer 810 analyzes data received from one or more of the sensor interface 804, the database 806, and/or the threshold calculator 808. In some examples, the parameter analyzer 810 can analyze data from the condition determiner 210 of FIG. 2 and/or the load mapper 204 of FIG. 2. In particular, the parameter analyzer 810 analyzes the parameter(s) associated with the first vehicle 104 and/or performs one or more comparisons of the parameter(s) to one or more thresholds (e.g., calculated and/or determined via the threshold calculator 808), for example, to determine whether an example threshold is satisfied, whether a threshold is exceeded, a degree to which a threshold is exceeded, etc. In some examples, the parameter analyzer 810 can determine the load condition of the vehicle 104 based on a comparison of the parameter(s) with the one or more thresholds.

In some examples, based on a value or magnitude of a parameter relative to a value or magnitude of an example threshold, the parameter analyzer 810 enables the adjustment calculator 812 to calculate and/or determine one or more adjustments for the fourth light 700 and/or the horn 606. In some examples, based on a change in the parameter, the parameter analyzer 810 similarly enables the adjustment calculator 812 to calculate and/or determine one or more adjustments for the fourth light 700 and/or the horn 606. As such, the parameter analyzer 810 may transmit (e.g., via the wired and/or wireless communication link(s) 814) computed data to the adjustment calculator 812 and/or the database 806.

In the example of FIG. 8, the threshold calculator 808 calculates and/or determines one or more thresholds for the example parameter analyzer 810 based on data received from the mobile device 120 and/or the database 806. In some examples, the threshold calculator 808 calculates and/or determines one or more threshold loads based on a trailer weight (e.g., a combined weight of a trailer as well as contents carried thereby). In such examples, an example threshold load (e.g., a load threshold, etc.) corresponds to a proportion (e.g., between about 10% and about 25%) of the trailer weight. The trailer weight may be stored in the database 806 and/or provided to the example indicator system 800 by a user, for example, via the mobile device 120. In other examples, the trailer weight may be provided to the example indicator system 800 via one or more other suitable input devices such as, for example, an electronic device that is disposed in the first vehicle 104 and communicatively coupled to the indicator system 800 (e.g., via the communication link(s) 814).

In some examples, the threshold calculator 808 calculates and/or determines one or more threshold weights based on a capacity or weight limit (e.g., a front axle weight limit, a rear axle weight limit, a gross vehicle weight limit, etc.) associated with the example first vehicle 104. In such examples, an example threshold weight corresponds to one or more proportions (e.g., 80%, 90%, 100%, 110%, etc.) of the weight limit. The weight capacity of the first vehicle 104 may be stored in the database 806 and/or provided to the example indicator system 800 by a user (e.g., via the mobile device 120, an electronic device disposed in the first vehicle 104, etc.).

Further, in some examples, the threshold calculator 808 similarly calculates and/or determines one or more other thresholds (e.g., a threshold temperature, a threshold pressure, a threshold position, a threshold power, a threshold sound intensity, etc.) that facilitate control of the example fourth light 700 by the indicator system 800. For example, the threshold calculator 808 calculates and/or determines a threshold axle load corresponding to a certain proportion (e.g., about 25%) of a load imparted on an axle (e.g., a front axle) of the first vehicle 104, which can enable the indicator system 800 to visually assist a person in configuring a load distributing hitch. That is, in such examples, the threshold axle load is based on an axle load provided by the first vehicle 104 being stationary without a trailer coupled thereto. In some examples, the threshold calculator 808 calculates and/or determines an example threshold temperature corresponding to one or more of an engine temperature, an oil temperature, and/or a cabin temperature that may be desired by a person. In some examples, the threshold calculator 808 calculates and/or determines an example threshold fluid pressure corresponding to a certain tire pressure (e.g., 30 pounds per square inch (PSI), 35 PSI, 40 PSI, etc.) of the first vehicle 104 and/or a fuel tank pressure of the first vehicle 104. In some examples, the threshold calculator 808 calculates and/or determines an example threshold distance corresponding to a position of a trailer tongue relative to a hitch and/or a ball. In another example, the threshold calculator 808 calculates and/or determines an example threshold electrical current, an example threshold voltage, and/or an example threshold power associated with the battery and/or the generator of the first vehicle 104.

In the example of FIG. 8, the example adjustment calculator 812 performs one or more calculations associated with controlling the example fourth light 700 (e.g., controlling one or more of the example LEDs 702*a-j*) and/or the example horn 606. As such, in some examples, the adjustment calculator 812 transmits (e.g., via the wired and/or wireless communication link(s) 814) computed data to the database 806 and/or the light interface 802. In particular, the example adjustment calculator 812 calculates and/or determines adjustments of the visual characteristic(s) of the fourth light 700 and/or the audible characteristic(s) of the horn 606 based on the analyses and/or the comparisons performed by the parameter analyzer 810.

In some examples, when controlling the fourth light 700, an example adjustment includes increasing or decreasing an intensity or brightness of the fourth light 700. In some examples, an example adjustment includes changing a color generated by the fourth light 700. In some examples, an example adjustment includes increasing or decreasing a frequency at which the fourth light 700 blinks.

Further, in examples where the first vehicle 104 is implemented with the example LEDs 702*a-j*, an example adjustment includes changing between predetermined visual patterns. For example, an example adjustment includes activating, deactivating, and/or changing a color of some of the LEDs 702*a-j* (e.g., while maintaining visual characteristic(s) of the other ones of the LEDs 702*a-j*).

In some examples, when controlling the horn 606, an example adjustment includes increasing or decreasing an intensity or volume of the horn 606. In some examples, an example adjustment includes increasing or decreasing a pitch of the horn 606. In some examples, an example adjustment includes increasing or decreasing a frequency at which the horn 606 is repeatedly activated and deactivated.

After determining one or more adjustments for the fourth light 700, the adjustment calculator 812 transmits (e.g., via the wired and/or wireless communication link(s) 814) the adjustment(s) to the light interface 802 to control the fourth light 700 accordingly. In particular, the example light interface 802 directs the fourth light 700 to change or adjust one or more of the visual characteristics thereof in accordance with the calculated adjustment(s) to visually communicate to a person external to the first vehicle 104.

Similarly, in some examples, after determining one or more adjustments for the horn 606, the adjustment calculator 812 transmits (e.g., via the wired and/or wireless communication link(s) 814) the adjustment(s) to the horn interface 803 to control the horn 606 accordingly. In particular, the example horn interface 803 directs the horn 606 to change or adjust one or more of the audible characteristics thereof in accordance with the calculated adjustment(s) to audibly communicate to a person external to the first vehicle 104.

The database 806 of the illustrated example stores and/or provides access to data associated with the example first vehicle 104 of FIGS. 1 and 6, the example fourth light 700 of FIG. 7, and/or the example indicator system 800. For example, the example database 806 receives data from and/or transmits data to (e.g., via the wired and/or wireless communication link(s) 814) one or more of the light interface 802, the sensor interface 804, the threshold calculator 808, the parameter analyzer 810, and/or the adjustment calculator 812. Additionally or alternatively, the database 806 stores sensor data generated by the sensor(s) 610.

In some examples, the database 806 stores one or more predetermined visual and/or audible characteristics associated with controlling the fourth light 700 and/or the horn 606. In some examples, the database 806 stores one or more predetermined frequencies (e.g., 1 hertz, 5 hertz, 10 hertz, etc.). In some examples, the database 806 stores one or more predetermined colors (e.g., green, yellow, red, etc.).

In examples where the first vehicle 104 is implemented with the LEDs 702*a-j* (and/or one or more other light sources), the database 806 stores one or more predetermined visual patterns to be generated by the LEDs 702*a-j*. For example, a first example predetermined visual pattern includes some of the LEDs 702*a-j* being activated while the other of the LEDs 702*a-j* are deactivated. In some examples, a second example predetermined visual pattern includes all of the LEDs 702*a-j* being activated. In some examples, a third example predetermined visual pattern includes at least some of the LEDs 702*a-j* having a single color. In some examples, a fourth example predetermined visual pattern includes at least some of the LEDs 702*a-j* having different colors relative to each other. While some example visual patterns are disclosed herein in connection with the example LEDs 702*a-j*, in other examples, the indicator system 800 may control the LEDs 702*a-j* to provide one or more other visual patterns.

In some examples, the database 806 stores one or more predetermined sequences for controlling the example fourth light 700. For example, the database 806 stores one or more predetermined color sequences for the fourth light 700. In some examples, a first example predetermined color sequence includes consecutively changing the color of the fourth light 700 from red, to yellow, and then to green. Conversely, in some examples, a second example predetermined color sequence includes consecutively changing the color of the fourth light 700 from green, to yellow, and then to red. While some example color sequences have been disclosed herein, in other examples, one or more other color sequences may be implemented when controlling the fourth light 700.

The mobile device 120 of the illustrated example facilitates user interaction with and/or input to the indicator system 800. For example, a person may provide data (e.g., a trailer weight, a vehicle weight limit, a fuel level, a cabin temperature, an oil temperature, a battery power level, a generator power level, etc.) and/or view data (e.g., a measured parameter) via the mobile device 120 (e.g., before, during, and/or after a loading event). As such, the mobile device 120 of FIGS. 1 and 6 is communicatively coupled to the indicator system 800 via the communication link(s) 814. However, in other examples, the indicator system 800 may be communicatively coupled to one or more other suitable user devices (e.g., an electronic device disposed in the first vehicle 104) to provide and/or facilitate user interaction and/or input.

While an example manner of implementing the example indicator system 800 is illustrated in FIG. 8, one or more of the elements, processes and/or devices illustrated in FIG. 8 may be combined, divided, re-arranged, omitted, eliminated and/or implemented in any other way. Further, the example light interface 802, the example horn interface 803, the example sensor interface 804, the example database 806, the example threshold calculator 808, the example parameter analyzer 810, the example adjustment calculator 812 and/or, more generally, the example indicator system 800 of FIG. 8 may be implemented by hardware, software, firmware and/or any combination of hardware, software and/or firmware. Thus, for example, any of the example light interface 802, the example horn interface 803, the example sensor interface 804, the example database 806, the example threshold calculator 808, the example parameter analyzer 810, the example adjustment calculator 812 and/or, more generally, the example indicator system 800 of FIG. 8 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example light interface 802, the example horn interface 803, the example sensor interface 804, the example database 806, the example threshold calculator 808, the example parameter analyzer 810, the example adjustment calculator 812 and/or, more generally, the example indicator system 800 of FIG. 8 is/are hereby expressly defined to include a non-transitory computer readable storage device or storage disk such as a memory, a digital versatile disk (DVD), a compact disk (CD), a Blu-ray disk, etc. including the software and/or firmware. Further still, the example indicator system 800 of FIG. 8 may include one or more elements, processes and/or devices in addition to, or instead of, those illustrated in FIG. 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figures 9A, 9B:
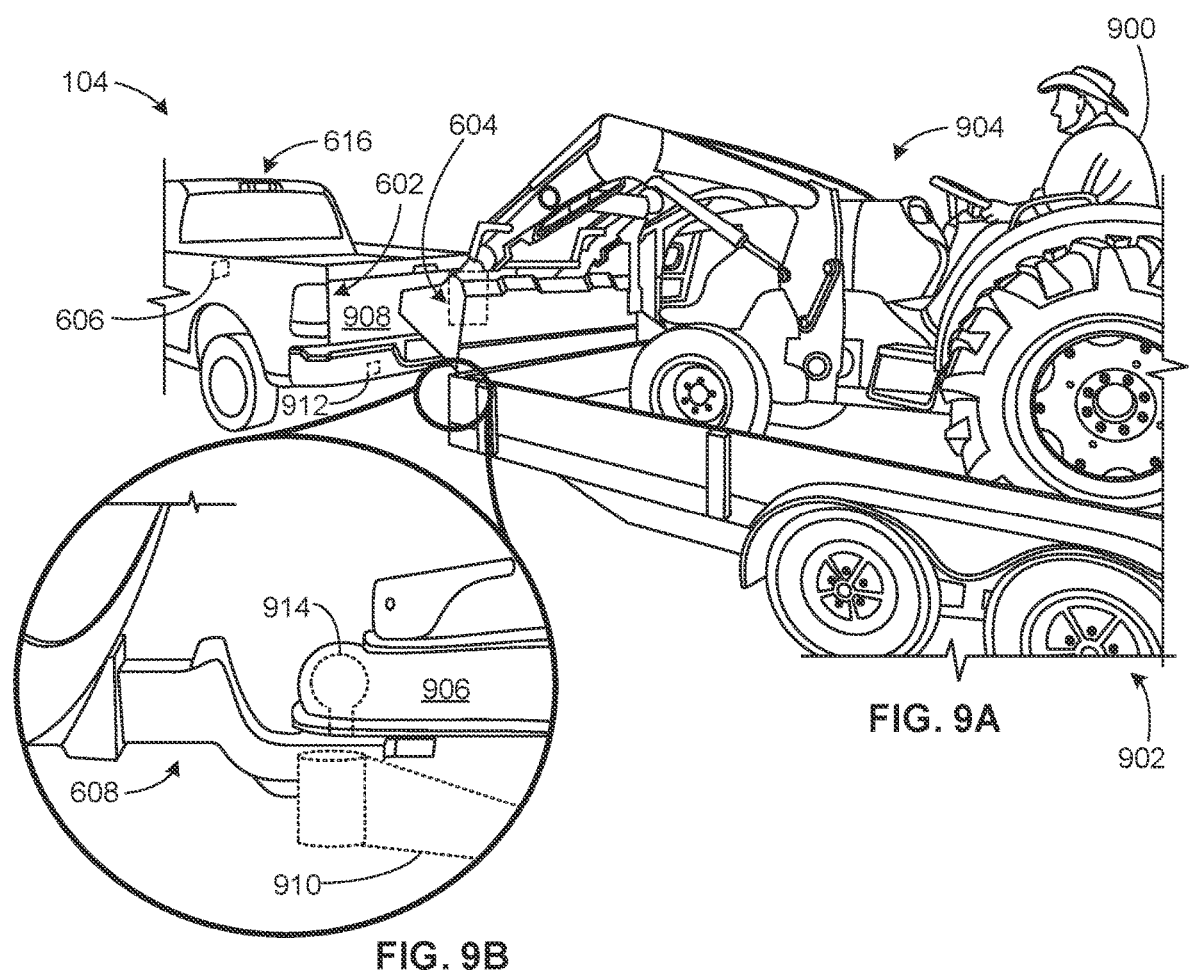
FIG. 9A illustrates example trailer monitoring and light control that may be implemented in examples disclosed herein.
FIG. 9B is a detailed partial-view of the example vehicle of FIG. 1 showing an example hitch.

FIG. 9A illustrates example trailer monitoring and light control that may be implemented in examples disclosed herein. According to the illustrated example of FIG. 9A, a person (e.g., a driver, a passenger, a vehicle servicer, etc.) 900 is loading an example trailer 902 with an example second vehicle (e.g., a tractor) 904 (e.g., without assistance from another person). The trailer 902 of the illustrated example is movably and/or operatively coupled to the first vehicle 104 via the example hitch 608 (FIG. 9B) interposed therebetween. In particular, to ensure proper performance and/or handling of the example first vehicle 104 during use, the person 900 is positioning the second vehicle 904 on the trailer 902 such that a tongue 906 (FIG. 9B) of the trailer 902 imparts a certain force or load (sometimes referred to as tongue ball weight) on a ball of the hitch 608, which ensures proper vehicle handling and/or maneuverability when driving.

While the example of FIG. 9A depicts the example trailer 902 as being a bumper pull trailer, in other examples, the first vehicle 104 may be associated with and/or tow one or more other suitable trailers such as, for example, a gooseneck trailer. In such examples, as previously mentioned, the example vehicle 104 may be implemented with a gooseneck hitch and/or a fifth wheel instead of the example hitch 608. Further, in some examples, the example trailer 902 receives or carries cargo, equipment, one or more other vehicles, etc. in addition or alternatively to the example second vehicle 904.

To assist the person 900 in loading the trailer 902, the example indicator system 800 controls (e.g., via the light interface 802) one or more lights of the first vehicle 104 based on data received from the aforementioned sensor(s) 610 such as, for example, the example first light 602, the example second light 604, and/or the example third light 616. According to the illustrated example, one or more of the example lights 602, 604, 616 of the first vehicle 104 may correspond to the example fourth light 700, as previously mentioned. As shown in FIG. 9A, the example lights 602, 604, 616 are positioned at a back or rear portion 908 of the first vehicle 104 and/or face toward the person 900 to facilitate viewing while loading the trailer 902.

As previously disclosed, the indicator system 800 detects (e.g., via the sensor interface 804) the load imparted on the hitch 608 by the trailer tongue 906 and compares (e.g., via the parameter analyzer 810) the load to an example threshold load (e.g., a value corresponding to a proportion of a weight of the trailer 902). In the illustrated example of FIG. 9A, the indicator system 800 enables the light(s) 602, 604, 616 to generate a predetermined visual indicator based on a magnitude of the load imparted on the hitch 608 relative to a magnitude of the threshold load, which can visually indicate to the person 900 when the trailer 902 is properly loaded and/or a degree to which the trailer 902 is improperly loaded.

In some examples, the indicator system 800 enables the light(s) 602, 604, 616 to blink at a predetermined frequency. In such examples, a relatively low frequency (e.g., 1 hertz) may visually indicate to the person 900 that the load imparted on the hitch 608 is below the threshold load and a relatively high frequency (e.g., 10 hertz) may visually indicate to the person 900 that the load imparted on the hitch 608 is proximate to the threshold load. Additionally or alternatively, in some examples, the indicator system 800 enables the light(s) 602, 604, 616 to generate one or more predetermined colors (e.g., stored in the database 806) to similarly provide visual indications to the person 900. For example, a first predetermined color (e.g., red) may visually indicate that the load imparted on the hitch 608 is below the threshold load. In some examples, a second predetermined color (e.g., yellow) may visually indicate the load imparted on the hitch 608 is proximate to the threshold load. In some examples, the third predetermined color (e.g., green) may visually indicate that the load imparted on the hitch 608 is about equal to the threshold load (e.g., the vehicle 904 is properly positioned on the trailer 902).

As the person 900 adjusts a position of the second vehicle 904 relative to the trailer 902, the indicator system 800 monitors the load of the hitch 608 for changes therein and determines (e.g., via the adjustment calculator 812) adjustments for the light(s) 602, 604, 616 in response. In some examples, as the load approaches the threshold load, the indicator system 800 increases (or decreases) the frequency at which the light(s) 602, 604, 616 blink, which may visually indicate to the person 900 that weight distribution of the trailer 902 is improving. In some examples, the indicator system 800 ceases blinking (e.g., maintains an intensity of or deactivates) the light(s) 602, 604, 616 in response to the load satisfying the threshold load, which may visually indicate to the person 900 that the second vehicle 904 is properly positioned on the trailer 902.

In some examples, based on a change in the load, the indicator system 800 generates, via the light(s) 602, 604, 616, the predetermined colors in accordance with one or more of the aforementioned predetermined color sequences. For example, as the load approaches the threshold load, the indicator system 800 generates consecutively, via the light(s) 602, 604, 616: (1) the first predetermined color; (2) the second predetermined color; and (3) the third predetermined color, which may visually indicate the weight distribution of the trailer 902 is improving.

Additionally or alternatively, in some examples, similar to the visual indications, the indicator system 800 controls the example horn 606 to audibly indicate to the person 900 the load status of the trailer 902 and/or the degree to which the trailer 902 is improperly loaded. For example, the indicator system 800 enables the horn 606 to activate and deactivate at a predetermined frequency based on a magnitude of the load imparted on the hitch 608 relative to a magnitude of the threshold load. For example, a relatively low frequency (e.g., 1 hertz) may audibly indicate to the person 900 that the load imparted on the hitch 608 is below the threshold load, and a relatively high frequency (e.g., 10 hertz) may audibly indicate to the person 900 that the load imparted on the hitch 608 is proximate to the threshold load.

In such examples, as the person 900 adjusts a position of the second vehicle 904 relative to the trailer 902, the indicator system 800 determines (e.g., via the adjustment calculator 812) adjustments for the horn 606 in response. For example, as the load approaches the threshold load, the indicator system 800 increases (or decreases) the frequency at which the horn generates sound, which may audibly indicate to the person 900 that weight distribution of the trailer 902 is improving. In some examples, the indicator system 800 ceases activating and deactivating (e.g., maintains a volume of or deactivates) the horn 606 in response to the load satisfying the threshold load, which may audibly indicate to the person 900 that the second vehicle 904 is properly positioned on the trailer 902.

In some examples, after properly loading the trailer 902, the indicator system 800 can further inform the person 900 of the trailer load status via the example mobile device 120, for example, if a position of second vehicle 904 relative to the trailer 902 changes during use of the first vehicle 104. In particular, the mobile device 120 may generate and/or display a warning to the person in response to indicator system 800 determining that the load imparted on the hitch 608 no longer satisfies the threshold load. For example, the mobile device 120 can generate an augment reality environment (e.g., the augmented reality environment 308 of FIG. 3, the augmented reality environment 402 of FIG. 4, etc.) that includes a warning indicating the load threshold is not satisfied (e.g., the warning 310 of FIG. 3, the warning 404 of FIG. 4, etc.)

In some examples, the example hitch 608 is a weight distributing hitch having one or more arms 910 (FIG. 9B) (one of which is shown in this example) extending therefrom to carry out front axle load restoration for the vehicle 104. The arm(s) 910 of the illustrated example are adjustably coupled to at least a portion of the trailer 902 to generate a torque and apply the torque to the hitch 608 and the first vehicle 104. In particular, the person 900 increases or decreases the torque by adjusting one or more of chains, cables, brackets, etc. that couple the arm(s) 910 to the portion of the trailer 902, thereby increasing or decreasing a load imparted on a front axle of the first vehicle 104.

In such examples, the indicator system 800 detects (e.g., via the sensor interface 804) a load imparted on the front axle of the first vehicle 104 and compares (e.g., via the parameter analyzer 810) the axle load to an example threshold axle load. In particular, the threshold axle load corresponds to a certain proportion (e.g., about 25%) of a load imparted on the front axle of the first vehicle 104 when the trailer tongue 906 is decoupled or disengaged from the hitch 608. When the axle load is substantially equal to the threshold axle load, the arm(s) 910 and/or the hitch 608 are considered to be properly configured.

In such examples, to assist the person 900 in configuring the arm(s) 910 and/or the hitch 608, the indicator system 800 enables the light(s) 602, 604, 616 to generate a predetermined visual indicator based on a magnitude of the axle load relative to a magnitude of the threshold axle load. In this manner, the indicator system 800 visually indicates to the person 900 when the arm(s) 910 and/or the hitch 608 are properly configured and/or a degree to which the arm(s) 910 and/or the hitch 608 are improperly configured. As such, as the person 900 adjusts the torque generated by the arm(s) 910 of the hitch 608, the indicator system 800 monitors the load of the front axle for changes therein and determines (e.g., via the adjustment calculator 812) adjustments for the light(s) 602, 604, 616 in response to be implemented by the light(s) 602, 604, 616.

In some examples, when the first vehicle 104 is implemented with autonomous functionality, the indicator system 800 assists the person in coupling the trailer 902 to the first vehicle 104 during an autonomous vehicle event. In such examples, the indicators system 800 communicates with an example sensor (e.g., a camera, an infrared sensor, an ultrasonic sensor, etc.) 912, which is positioned on the rear portion 908 of the first vehicle 104 in this example. In particular, the indicator system 800 identifies, via the sensor 912, a relative position of at least a portion (e.g., a ball 914) of the hitch 608 as well as a relative position of at least a portion (e.g., the tongue 906) of the trailer 902. For example, the indicator system 800 analyzes and/or otherwise processes the data received from the sensor 912 to calculate and/or determine the positions based on one or more related equations, algorithms, and/or methods or techniques. Further, in some such examples, the indicator system 800 calculates and/or determines a distance between the portion of the hitch 608 and the portion of the trailer 902, which enables the indicator system 800 to control the light(s) 602, 604, 616 to visually indicate a proximity of the portion of the hitch 608 relative to the portion of the trailer 902.

In such examples, when the first vehicle 104 is autonomously maneuvering to reduce (e.g., minimize) the distance between the ball 914 and the tongue 906, the indicator system 800 controls the light(s) 602, 604, 616 to visually indicate the same to the person 900. In this manner, the person 900 is enabled to determine whether the first vehicle 104 is driving autonomously and/or a proximity of the ball 914 relative to the tongue 906.

Figure 10A:
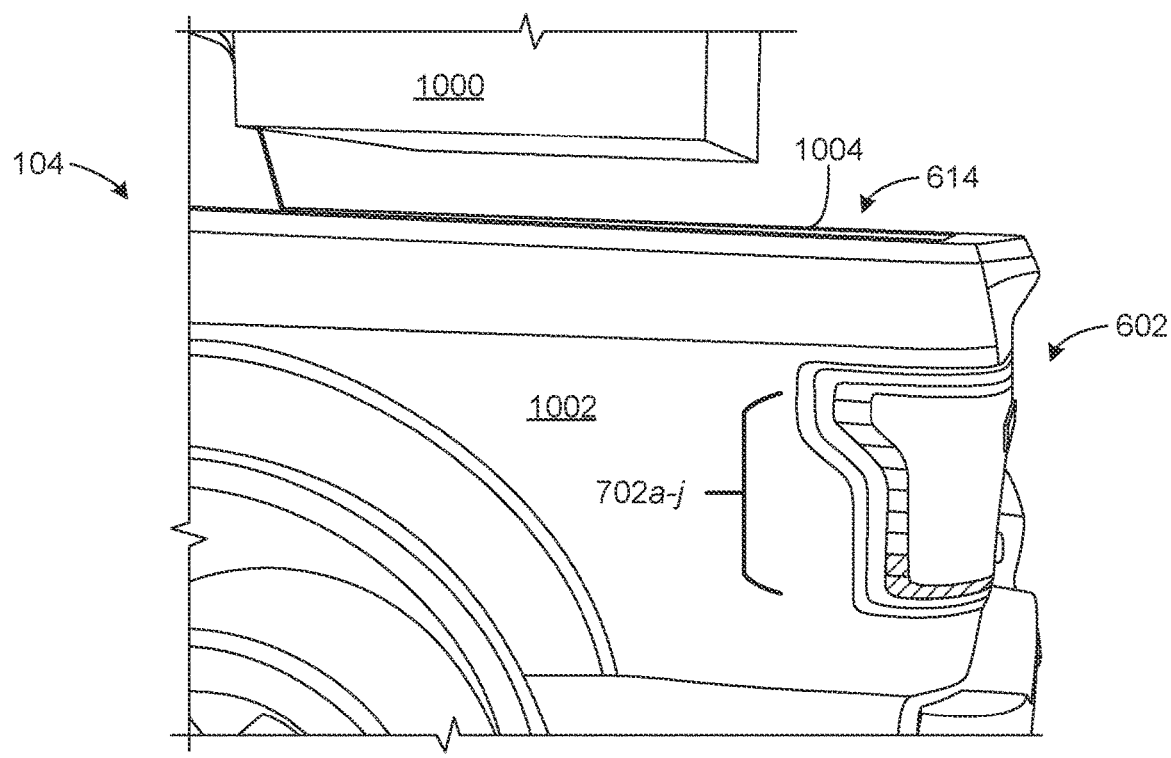
FIGS. 10A and 10B illustrate example vehicle monitoring and light control that may be implemented in examples disclosed herein.
Figure 10B:
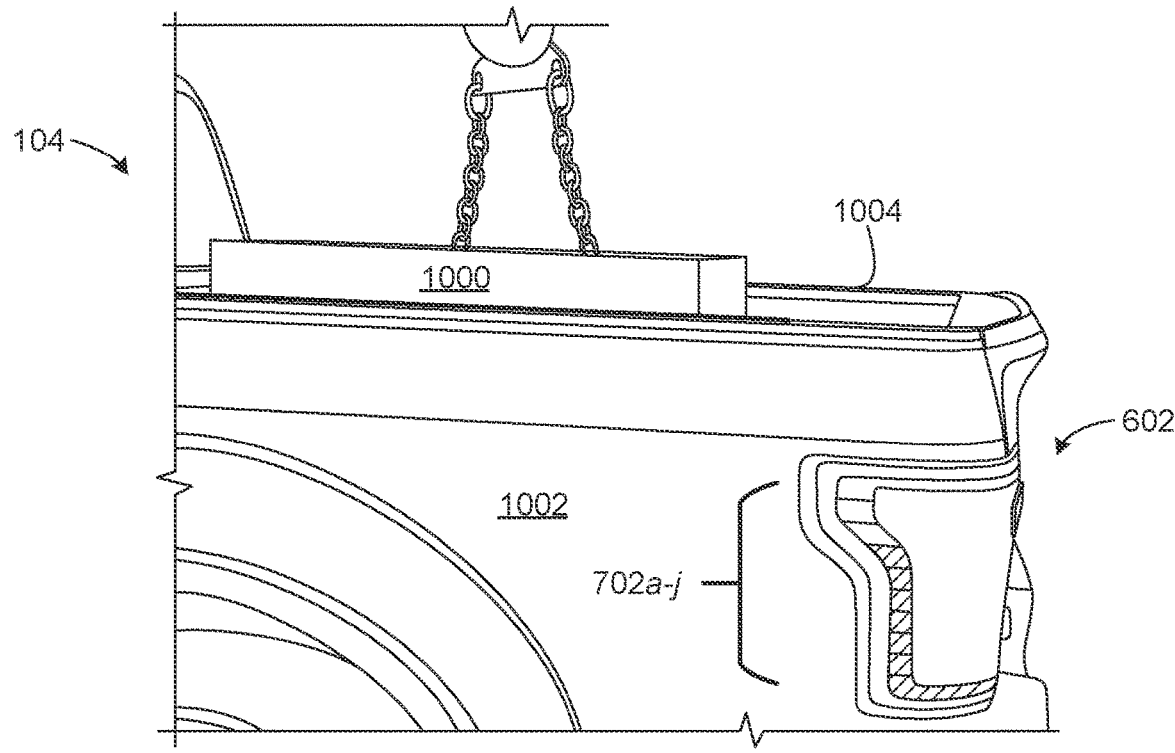

FIGS. 10A and 10B illustrate example vehicle monitoring and light control that may be implemented in examples disclosed herein. According to the illustrated example of FIGS. 10A and 10B, the person 900 is loading the aforementioned vehicle 104 with an example object 1000 (e.g., without assistance from another person). As shown in FIGS. 10A and 10B, the object 1000 is being positioned in the bed 614 of the first example vehicle 104. In particular, to ensure proper performance and/or handling of the first vehicle 104 during use, the person 900 is loading the first vehicle 104 such that a weight of the first vehicle 104 (e.g., a weight corresponding to the object 1000 and/or a combination of the object 1000 and the first vehicle 104) remains below a capacity or weight limit (e.g., stored in the databased 806) associated with the first vehicle 104.

While the examples of FIGS. 10A and 10B depict the first vehicle 104 as being loaded with the object 1000, in other examples, the first vehicle 104 may receive cargo, equipment, etc. in addition or alternatively to the object 1000.

To assist the person 900 in loading the first vehicle 104, the example indicator system 800 controls (e.g., via the light interface 802) one or more lights of the first vehicle 104 based on data received from the aforementioned sensor(s) 610 such as, for example, the example first light 602, the example second light 604, and/or the example third light 616 of the first vehicle 104, one or more of which may correspond to the aforementioned fourth light 700 of FIG. 7. According to the illustrated example of FIGS. 10A and 10B, the example first light 602 is implemented with the aforementioned LEDs 702a-j of FIG. 7 such that the person 900 can view and/or inspect the LEDs 702a-j when positioning content(s) in the bed 614.

As previously disclosed, the indicator system 800 detects (e.g., via the sensor interface 804) a weight of the first vehicle 104 and compares (e.g., via the parameter analyzer 810) the weight to one or more example threshold weights (e.g., values corresponding to proportions (e.g., 80%, 90%, 100%, 110%, etc.) of the weight limit of the first vehicle 104). In the illustrated example of FIG. 10A, the indicator system 800 directs the fourth light 700 to generate a predetermined visual indicator based on a magnitude of the weight relative to a magnitude of the threshold weight, which can visually indicate to the person 900 when the first vehicle 104 is properly loaded and/or a degree to which the first vehicle 104 is loaded below or above the weight limit.

In some examples, the indicator system 800 enables the first light 602 to generate one or more predetermined colors (e.g., stored in the database 806). For example, the indicator system 800 generates, via the first light 602, the third predetermined color (e.g., green) in response to the weight of the first vehicle 104 being at or below a first example threshold weight (e.g., about 80% of the weight limit), which may visually indicate to the person 900 that the first vehicle 104 is loaded below the weight limit thereof. In some examples, the indicator system 800 generates, via the first light 602, the second predetermined color (e.g., yellow) in response to the weight being between the first threshold weight and a second example threshold weight (e.g., between about 90% and about 100% of the weight limit), which may visually indicate to the person 900 that the first vehicle 104 is loaded near the weight limit. In some examples, the indicator system 800 generates, via the first light 602, the first predetermined color (e.g., red) in response to the weight being between the second threshold weight and a third example threshold weight (e.g., about 110% of the weight limit), which may visually indicate to the person 900 that the first vehicle 104 is loaded over the weight limit thereof. In some examples, the indicator system 800 enables at least a portion (e.g., some of the LEDs 702a-j) of the first light 602 to blink at a predetermined frequency in response to the weight being at or above the third threshold weight.

Additionally or alternatively, in some examples, the indicator system 800 enables the first light 602 to blink at a predetermined frequency, which may visually indicate the status of the first vehicle 104. For example, a relatively low frequency (e.g., 1 hertz) may indicate the weight of the first vehicle 104 is below the weight limit, and a relatively high frequency (e.g., 10 hertz) may indicate the weight of the first vehicle 104 is proximate to or at the weight limit. Further, in such examples, the indicator system 800 can enable the first light 602 to cease blinking in response to the vehicle weight exceeding the weight limit.

In some examples, the indicator system 800 enables the example LEDs 702a-j to generate one or more predetermined visual patterns. For example, as shown in the example of FIG. 10A, the indicator system 800 activates some (e.g., 702a and 702b) of the LEDs 702a-j while deactivating the other (e.g., 702c-j) of the LEDs 702a-j. Further, in the illustrated example of FIG. 10A, the indicator system 800 enables the activated ones (as represented by the texture/shading) of the LEDs 702a-j to generate the third predetermined color to indicate the vehicle weight is below the weight limit.

According to the illustrated example of FIG. 10B, the person 900 is increasing the weight of the first vehicle 104 by lowering the object 1000 into the bed 614. In particular, the indicator system 800 monitors the weight of the first vehicle 104 for changes therein and determines (e.g., via the adjustment calculator 812) adjustments for the first light 602 in response.

In some examples, as the weight of the first vehicle 104 increases and/or approaches the weight limit thereof, the indicator system 800 consecutively actives or powers adjacent LEDs 702a-j of the first light 602. For example, the indicator system 800 consecutively activates: (1) the first example LED 702a; (2) the second example LED 702b; (3) the third example LED 702c; etc., which may visually indicate to the person 900 that the weight is approaching the weight limit. Conversely, in some examples, in response to the weight of the first vehicle 104 decreasing and/or falling below the weight limit thereof, the indicator system 800 consecutively deactivates: (1) the tenth example LED 702j; (2) the ninth example LED 702i; (3) the eighth example LED 702h; etc., which may visually indicate to the person 900 that the weight is falling below the weight limit.

In some examples, as the weight of the first vehicle 104 increases and/or approaches the weight limit thereof, the indicator system 800 enables at least a portion (e.g., at least some of the LEDs 702a-j) of the first light 602 to change color (e.g., in accordance with one or more of the aforementioned predetermined color sequences in the database 806). In some examples, as the weight of the first vehicle 104 increases and/or approaches the weight limit thereof, the indicator system 800 increases (or decreases) the frequency at which the first light 602 blinks, which may visually indicate to the person 900 that weight is approaching the weight limit. In some such examples, the indicator system 800 ceases blinking (e.g., maintains an intensity of or deactivates) the first light 602 in response to the weight satisfying the threshold weight.

Further, in some examples, the indicator system 800 controls some of the example vehicle lights 602, 604, 616 different from the other lights 602, 604, 616 to visually indicate a distribution (e.g., a side-to-side distribution) of the vehicle weight. For example, the indicator system 800 detects a first load imparted on and/or associated with a first side (e.g., a left side) 1002 of the first vehicle 104 and a second load imparted on and/or associated with a second side (e.g., a right side) 1004 of the first vehicle 104 opposite the first side 1002. In such examples, the indicator system 800 analyzes the loads and/or compares to the loads to one or more threshold loads and, in response, generates a first predetermined visual indicator via the first light 602 based on the first load and a second predetermined visual indicator (e.g., different from the first predetermined visual indicator) via the second light 604 based on the second load. In this manner, the indicator system 800 visually indicates to the person 900 that the first side 1002 of the first vehicle 104 is loaded more or less than the second side 1004. Further, in such examples, the indicator system 800 adjusts independently the first light 602 and second light 604 based on the respective load changes in the first load and the second load.

Additionally or alternatively, in some examples, similar to the visual indicator, the indicator system 800 controls the example horn 606 to audibly indicate to the person 900 the load status of the first vehicle 104 and/or the degree to which the first vehicle 104 is loaded below or above the weight limit thereof. For example, the indicator system 800 enables the horn 606 to activate and deactivate at a predetermined frequency.

In some such examples, as the person 900 adjusts the weight of the first vehicle 104, the indicator system 800 determines (e.g., via the adjustment calculator 812) adjustments for the horn 606 in response. For example, as the weight of the first vehicle 104 approaches the weight limit thereof, the indicator system 800 increases (or decreases) the frequency at which the horn generates sound, which may audibly indicate to the person 900 that vehicle weight is approaching the weight limit. In some such examples, the indicator system 800 ceases activating and deactivating (e.g., maintains a volume of or deactivates) the horn 606 in response to the vehicle weight exceeding the weight limit, which may audibly indicate to the person 900 that the first vehicle 104 improperly loaded.

While the example of FIGS. 10A and 10B depict light control in association with load detection and/or monitoring, in some examples, the indicator system 800 similarly controls the example light(s) 602, 604, 616 in association with detecting and/or monitoring one or more other parameters of the first vehicle 104 and visually indicating one or more respective statuses to the person 900, as previously disclosed.

In some examples, the indicator system 800 of the illustrated example controls the light(s) 602, 604, 616 based on data from the sensor(s) 610 corresponding to a position of one or more windows (e.g., the example window 624) of the first vehicle 104 to visually indicate the position to the person 900. In such examples, the indicator system 800 controls at least some of the lights 602, 604, 616 differently from the other lights 602, 604, 616 to indicate which ones of the window(s) of the first vehicle 104 is/are open, closed, and/or a degree to which each window is open. For example, the indicator system 800 generates a first predetermined visual indicator via the first light 602 to visually indicate a first position of a vehicle window proximate thereto, a second predetermined visual indicator (e.g., different from the first predetermined visual indicator) via the second light 604 to visually indicate a second position (e.g., different from the first position) of a second window proximate thereto, etc. Further, in such examples, the indicator system 800 adjusts independently the first light 602, the second light 604, and/or one or more other vehicle lights based on the respective position changes in the vehicle windows. In this manner, the indicator system 800 enables the person 900 to accurately adjust one or more windows of the first vehicle 104 remotely (e.g., via an electronic key or fob communicatively coupled to the controller 612 and/or the first vehicle 104) and/or from a location external to the first vehicle 104.

In some examples, the indicator system 800 of the illustrated example controls the light(s) 602, 604, 616 based on data from the sensor(s) 610 corresponding to a position and/or engagement of one or more locks (e.g., the example lock 628) of the first vehicle 104 to visually indicate the same to the person 900. In such examples, the indicator system 800 controls at least some of the lights 602, 604, 616 differently from the other lights 602, 604, 616 to indicate which ones of the lock(s) of the first vehicle 104 is/are locked or unlocked.

In some examples, the indicator system 800 of the illustrated example controls the light(s) 602, 604, 616 based on data from the sensor(s) 610 corresponding to a fuel level of the first vehicle 104 to visually indicate the same to the person 900. In particular, in such examples, the indicator system 800 calculates and/or determines an amount of a fuel (e.g., gasoline) in the fuel tank of the first vehicle 104 and compares the amount of fuel to a threshold fuel level (e.g., a value corresponding to a proportion of a capacity of the fuel tank) and, in response, generates a predetermined visual indicator via the light(s) 602, 604, 616. Further, the indicator system 800 enables the light(s) 602, 604, 616 to change between predetermined visual indicators in response to detected changes in the fuel level. In this manner, the indicator system 800 visually assists the person 900 in filling the fuel tank of the first vehicle 104 to a certain level, for example, that may be associated with a rented vehicle and/or required by a vehicle rental company to avoid additional costs and/or fees. In some such examples, the indicator system 800 may implement such control in response to one or more of a setting thereof being activated (e.g., via input to the mobile device 120) by the person, detected changes in the fuel level, and/or the fuel door 630 being open. That is, the indicator system 800 can detect and/or determine when the person 900 is fueling the first vehicle 104 and/or when fuel door 630 is open based on sensor data.

Accordingly, in some examples, the indicator system 800 of the illustrated example controls the light(s) 602, 604, 616 based on data from the sensor(s) 610 corresponding to a position and/or state associated with the fuel door 630 of the first vehicle 104 to visually indicate the same to the person 900. In particular, the indicator system 800 calculates and/or determines a fluid pressure in the fuel tank of the first vehicle 104 and compares the fluid pressure to a threshold fluid pressure indicative of the state of the fuel door and, in response, enables the light(s) 602, 604, 616 to generate a predetermined visual indicator to indicate to the person 900 whether the fuel door 630 is open or closed.

In some examples, the indicator system 800 of the illustrated example controls the light(s) 602, 604, 616 based on data received from the sensor(s) 610 corresponding to a fluid pressure of one or more tires (e.g., the example tire 632) of the first vehicle 104 to visually indicate the pressure of each tire to the person 900. In particular, the indicator system 800 enables the light(s) 602, 604, 616 to generate a predetermined visual indicator based on a magnitude of the fluid pressure relative to a magnitude of a fluid pressure threshold. In such examples, the indicator system 800 can control at least some of the lights 602, 604, 616 differently from the other lights 602, 604, 616 to indicate which ones of the tires of the first vehicle 104 are sufficiently filled or inflated and/or a degree to which each tire is inflated. For example, the indicator system 800 generates a first predetermined visual indicator via the first light 602 to visually indicate a first fluid pressure of the first example tire 632 proximate thereto, a second predetermined visual indicator (e.g., different from the first predetermined visual indicator) via the second light 604 to visually indicate a second fluid pressure (e.g., different from the first position) of a second tire of the first vehicle 104 proximate thereto, etc. Further, in such examples, the indicator system 800 adjusts independently the first light 602, the second light 604, and/or one or more other vehicle lights based on the respective fluid pressure changes in the tires of the first vehicle 104. In this manner, the indicator system 800 enables the person 900 to accurately adjust the pressure of one or more vehicle tires, for example, without checking a tire pressure using a tool (e.g., a pressure gauge).

Further, in such examples, the indicator system 800 can determine when a tire of the first vehicle 104 is being filled by the person 900 for example, based on detected fluid pressure changes in a vehicle tire. In response to determining that the person 900 is adjusting a pressure of at least one tire of the first vehicle 104, the indicator system 800 may implement control of the light(s) 602, 604, 616 accordingly to inform the person 900 of the tire pressure(s).

In some examples, the indicator system 800 of the illustrated example controls the light(s) 602, 604, 616 based on data received from the sensor(s) 610 corresponding to one or more of electrical power, voltage, and/or current associated with the battery and/or the generator of the first vehicle 104 to visually indicate the same to the person 900. In particular, the indicator system 800 enables the light(s) 602, 604, 616 to generate a predetermined visual indicator based on a magnitude of one or more of the power, the voltage, and/or the current relative to a magnitude of one or more respective thresholds (e.g., a threshold power, a threshold voltage, and/or a threshold current). Further, in such examples, the indicator system 800 changes or adjusts a visual characteristic of the light(s) 602, 604, 616 in response to detected changes in one or more of the power, the voltage, and/or the current.

In some examples, the indicator system 800 of the illustrated example controls the light(s) 602, 604, 616 based on data received from the sensor(s) 610 corresponding to one or more temperatures (e.g., a temperature of a cabin inside the first vehicle 104, a temperature of the engine of the first vehicle 104, a temperature of oil in the engine and/or the first vehicle 104, etc.) associated with the first vehicle 104 to visually indicate the same to the person 900. In particular, the indicator system 800 enables the light(s) 602, 604, 616 to generate a predetermined visual indicator based on a magnitude of the temperature relative to a magnitude of a threshold temperature. Further, in such examples, the indicator system 800 changes or adjusts a visual characteristic of the light(s) 602, 604, 616 in response to detected changes in the temperature.

In such examples, the indicator system 800 enables the person 900 to visually determine (e.g., from a location external to the first vehicle 104) whether a temperature in the first vehicle 104 (e.g., a temperature of the vehicle engine and/or the vehicle cabin) is sufficient and/or desirable to the person 900. In some examples, the indicator system 800 implements such control of the light(s) 602, 604, 616 in response to the person 900 starting the first vehicle 104 from a remote location, for example, via an electronic key or fob communicatively coupled to the indicator system 800. Similarly, in such examples, the indicator system 800 enables the person to visually determine whether a temperature of the oil of the first vehicle 104 is sufficiently cool before replacing or changing the oil.

In some examples, the indicator system 800 of the illustrated example controls the light(s) 602, 604, 616 based on data received from the sensor(s) 610 corresponding to a distance between the person 900 (and/or one or more other persons (e.g., a pedestrian)) and the first vehicle 104 to visually indicate the same to the person 900. For example, the indicator system 800 receives data from the sensor(s) 610 (e.g., a proximity sensor) and, in some examples, calculates and/or determines the distance based on one or more related equations, algorithms, and/or methods or techniques. In particular, the indicator system 800 enables the light(s) 602, 604, 616 to generate a predetermined visual indicator based on a magnitude of the distance. Further, in such examples, the indicator system 800 changes or adjusts a visual characteristic of the light(s) 602, 604, 616 in response to detected changes in the distance. In this manner, the indicator system 800 visually informs the person 900 (and/or one or more other persons) that the first vehicle 104 is approaching (e.g., when driving autonomously and/or in reverse) and/or of a relative proximity of the first vehicle 104. In such examples, the indicator system 800 may implement such control of the light(s) 602, 604, 616 in response to the first vehicle 104 being in a certain driving mode (e.g., an autonomous driving mode) and/or a certain gear (e.g., reverse).

Further, in some such examples, the indicator system 800 controls the light(s) 602, 604, 616 in this manner in response to the first vehicle 104 being parked and/or a vehicle alarm system being active. Accordingly, in such examples, the indicator system 800 may visually warn and/or deter an undesired person from approaching or entering the first vehicle 104 by adjusting the characteristic of the light(s) 602, 604, 616 based on a distance between the undesired person and the first vehicle 104.

In some examples, the indicator system 800 of the illustrated example controls the light(s) 602, 604, 616 based on data received from the sensor(s) 610 corresponding to a volume or sound intensity in and/or near the first vehicle 104 to visually indicate the same to the person 900. For example, the indicator system 800 detects and/or measures the sound intensity via the sensor(s) 610 (e.g., a microphone) and/or via an electrical or audio signal (e.g., generated by an electronic device (e.g., a radio) in the first vehicle 104) provided to the indicator system 800. In particular, the indicator system 800 enables the light(s) 602, 604, 616 to generate a predetermined visual indicator based on a magnitude of the sound intensity and/or the audio signal. Further, in such examples, the indicator system 800 changes or adjusts a visual characteristic of the light(s) 602, 604, 616 in response to detected changes in the sound intensity and/or the audio signal. In this manner, the indicator system 800 visually informs the person 900 (and/or one or more other persons) of changes in sound intensity, which may be entertaining and/or desirable to the person 900 (e.g., when tailgating and/or when the first vehicle 104 is parked).

Additionally or alternatively, in some examples, the indicator system 800 analyzes sensor data and controls the light(s) 602, 604, 616 of the first vehicle 104 in accordance with instructions provided by one or more users such as, for example, software and/or application developers. In such examples, the instructions may be stored in and/or installed on the example database 806 for execution by the indicator system 800.

Figure 11:
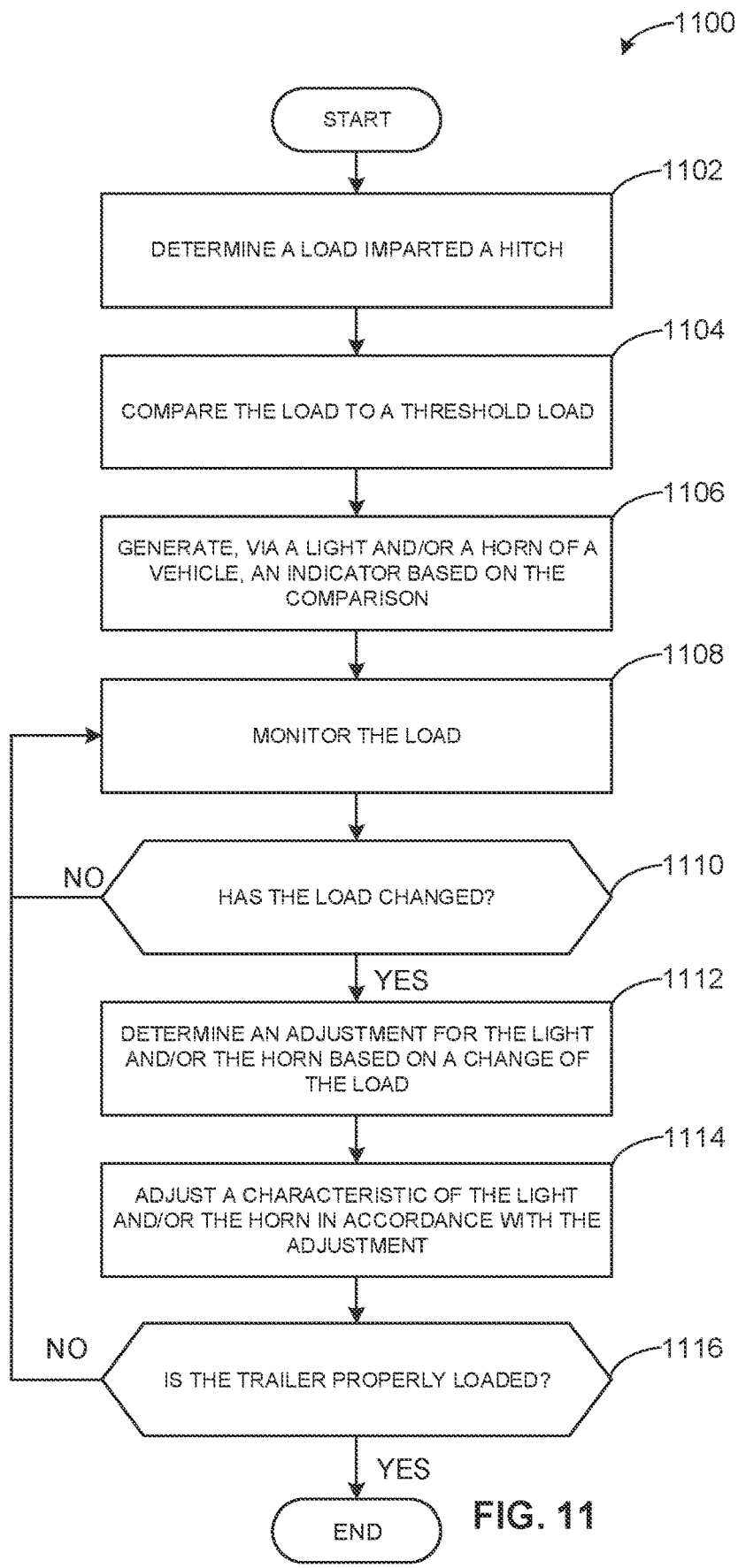
FIGS. 11 and 12 are flow diagrams of example methods that may be executed to implement the example indicator system of FIG. 8.
Figure 12:
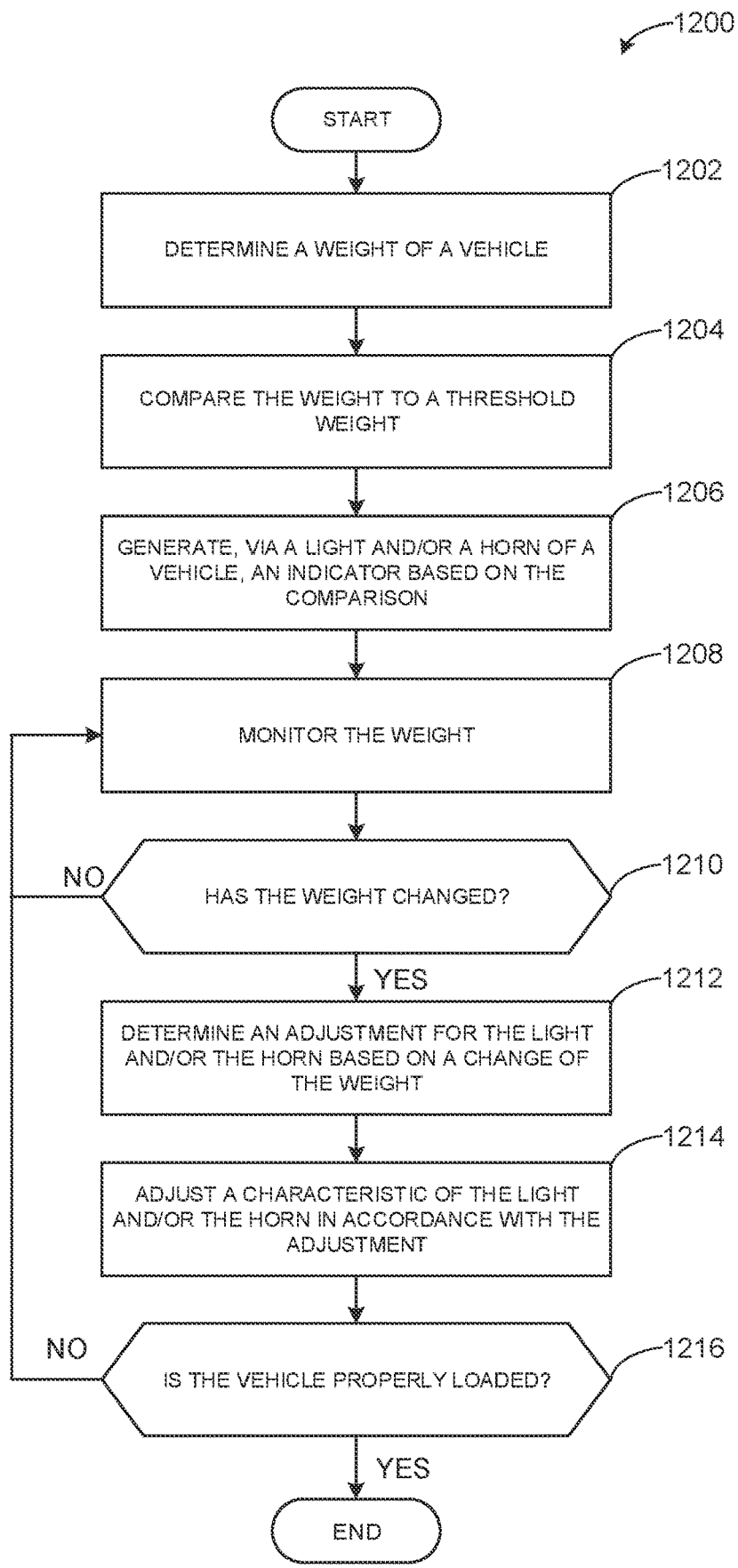

Flowcharts representative of example methods, hardware implemented state machines, and/or any combination thereof for implementing the indicator system 800 of FIG. 8 are shown in FIGS. 11 and 12. The method can be implemented using machine readable instructions that may be an executable program or portion of an executable program for execution by a computer processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example programs are described with reference to the flowcharts illustrated in FIGS. 11 and 12, many other methods of implementing the example indicator system 800 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc4.) structured to perform the corresponding operation without executing software or firmware.

As mentioned above, the example methods of FIGS. 11 and 12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information).

FIG. 11 is a flow diagram of an example method 1100 that may be executed to implement the example indicator system 800 of FIG. 8. The example method 1100 of FIG. 6 can be implemented in any of the example first vehicle 104 of FIGS. 1, 6, 9A, 9B, 10A, the example load manager 102 of FIGS. 1 and 2, the example fourth light 700 of FIG. 7, and/or the example indicator system 800 of FIG. 8.

The example method 1100 begins by determining a load imparted on a hitch (block 1102). In some examples, the indicator system 800 of FIG. 8 determines (e.g., via the sensor interface 804) a load imparted on the example hitch 608 by the trailer tongue 906 based on data received from the sensor(s) 610.

The example method 1100 also includes comparing the load to a threshold load (block 1104). In some examples, the indicator system 800 of FIG. 8 compares (e.g., via the parameter analyzer 810) the load imparted on the example hitch 608 to a threshold load (e.g., determined via the threshold calculator 808).

The example method 1100 also includes generating, via a light and/or a horn of a vehicle, an indicator based on the comparison (block 1106). In some examples, the indicator system 800 of FIG. 8 controls (e.g., via the light interface 802) one or more of the example first light 602, the example second light 604, the example third light 616, and/or the example fourth light 700 based on the comparison at block 1104. In particular, the indicator system 800 enables the light(s) 602, 604, 616, 700 to generate a predetermined visual indicator corresponding to a load status (e.g., properly or improperly loaded) of the example trailer 902 and/or a degree to which the trailer 902 is improperly loaded.

In some examples, the indicator system 800 controls (e.g., via the horn interface 803) the example horn 606 based on the comparison at block 1104. In such examples, the indicator system 800 enables the horn 606 to generate a predetermined audible indicator corresponding to the load status of the trailer 902 and/or the degree to which the trailer 902 is improperly loaded.

The example method 1100 also includes monitoring the load (block 1108). In some examples, the indicator system 800 of FIG. 8 monitors (e.g., via the sensor interface 804) the load imparted on the hitch 608 based on data received from the sensor(s) 610.

The example method 1100 also includes determining whether the load has changed (block 1110). In some examples, the indicator system 800 of FIG. 8 determines (e.g., via the parameter analyzer 810) whether the load imparted on the hitch 608 has changed. In some examples, if the indicator system 800 determines that the load has changed (block 1110: YES), control of the example method 1100 proceeds to block 1112. Otherwise, if the indicator system 800 determines that the load has not changed (block 1110: NO), control of the example method 1100 returns to block 1108.

The example method 1100 also includes determining an adjustment for the light and/or the horn based on a change of the load (block 1112). In some examples, the indicator system 800 of FIG. 8 determines (e.g., via the adjustment calculator 812) an adjustment for one or more of the lights 602, 604, 616, 700 based on a change in the load. In particular, the adjustment includes a change in a visual characteristic of the light(s) 602, 604, 616, 700 based on the change in the load.

In some examples, the indicator system 800 of FIG. 8 determines (e.g., via the adjustment calculator 812) an adjustment for the horn 606 based on a change in the load. In particular, the adjustment includes a change in an audible characteristic of the horn 606 based on the change in the load.

The example method 1100 also includes adjusting a characteristic of the light and/or the horn in accordance with the adjustment (block 1114). In some examples, the indicator system 800 of FIG. 8 changes or adjusts (e.g., via the light interface 802) a visual characteristic of one or more of the lights 602, 604, 616, 700 in accordance with the adjustment at block 1112. In some examples, the indicator system 800 of FIG. 8 changes or adjusts (e.g., via the horn interface 803) an audible characteristic of the horn 606 in accordance with the adjustment at block 1112.

The example method 1100 also includes determining whether the trailer is properly loaded (block 1116). In some examples, the indicator system 800 of FIG. 8 determines whether the example trailer 902 is properly loaded. If the indicator system 800 determines the trailer 902 is properly loaded (block 1116: YES), the example method 1100 ends. Otherwise, in some examples, if the indicator system 800 determines the trailer 902 is not properly loaded (block 1116: NO), control of the example method 1100 returns to block 1108.

FIG. 12 is a flow diagram of an example method 1200 that may be executed to implement the example indicator system 800 of FIG. 8. The example method 1200 of FIG. 12 can be implemented in any of the example first vehicle 104 of FIGS. 1, 6. 9A, 9B, 10A, and 10B, the example load manager 102 of FIGS. 1 and 2, the example fourth light 700 of FIG. 7, and/or the example indicator system 800 of FIG. 8.

The example method 1200 begins by determining a weight of a vehicle (block 1202). In some examples, the indicator system 800 of FIG. 8 determines (e.g., via the sensor interface 804) a weight of the example first vehicle 104 based on data received from the sensor(s) 610.

The example method 1200 also includes comparing the weight to a threshold weight (block 1204). In some examples, the indicator system 800 of FIG. 8 compares (e.g., via the parameter analyzer 810) the weight of the first vehicle 104 to one or more threshold weights (e.g., determined via the threshold calculator 808).

The example method 1200 also includes generating, via a light and/or a horn of the vehicle, an indicator based on the comparison (block 1206). In some examples, the indicator system 800 of FIG. 8 controls (e.g., via the light interface 802) one or more of the example first light 602, the example second light 604, the example third light 616, and/or the example fourth light 700 based on the comparison at block 1204. In particular, the indicator system 800 enables the light(s) 602, 604, 616, 700 to generate a predetermined visual indicator corresponding to a load status (e.g., properly or improperly loaded) of the first vehicle 104 and/or a degree to which the first vehicle 104 is loaded below or above a weight limit thereof.

In some examples, the indicator system 800 controls (e.g., via the horn interface 803) the example horn 606 based on the comparison at block 1204. In such examples, the indicator system 800 enables the horn 606 to generate a predetermined audible indicator corresponding to the load status of the first vehicle 104 and/or the degree to which the first vehicle 104 is loaded below or above the weight limit.

The example method 1200 also includes monitoring the weight (block 1208). In some examples, the indicator system 800 of FIG. 8 monitors (e.g., via the sensor interface 804) the weight of the first vehicle 104 based on data received from the sensor(s) 610.

The example method 1200 also includes determining whether the weight has changed (block 1210). In some examples, the indicator system 800 of FIG. 8 determines (e.g., via the parameter analyzer 810) whether the weight of the first vehicle 104 has changed. In some examples, if the indicator system 800 determines that the vehicle weight has changed (block 1210: YES), control of the example method 1200 proceeds to block 1212. Otherwise, if the indicator system 800 determines that the load has not changed (block 1210: NO), control of the example method 1200 returns to block 1208.

The example method 1200 also includes determining an adjustment for the light and/or the horn based on a change in the weight (block 1212). In some examples, the indicator system 800 of FIG. 8 determines (e.g., via the adjustment calculator 812) an adjustment for one or more of the lights 602, 604, 616, 700 based on a change in the weight of the first vehicle 104. In particular, the adjustment includes changing a visual characteristic of the light(s) 602, 604, 616, 700 based on the change in the weight.

In some examples, the indicator system 800 of FIG. 8 determines (e.g., via the adjustment calculator 812) an adjustment for the horn 606 based on the change in the weight of the first vehicle 104. In particular, the adjustment includes changing an audible characteristic of the horn 606 based on the change in the weight.

The example method 1200 also includes adjusting a characteristic of the light and/or the horn in accordance with the adjustment (block 1214). In some examples, the indicator system 800 of FIG. 8 changes or adjusts (e.g., via the light interface 802) a visual characteristic of one or more of the lights 602, 604, 616, 700 in accordance with the adjustment at block 1212. In some examples, the indicator system 800 of FIG. 8 changes or adjusts (e.g., via the horn interface 803) an audible characteristic of the horn 606 in accordance with the adjustment at block 1212.

The example method 1200 also includes determining whether the vehicle is properly loaded (block 1216). In some examples, the indicator system 800 of FIG. 8 determines whether the example first vehicle 104 is properly loaded. If the indicator system 800 determines the first vehicle 104 is properly loaded (block 1216: YES), the example method 1200 ends. Otherwise, in some examples, if the indicator system 800 determines the first vehicle 104 is not properly loaded (block 1216: NO), control of the example method 1200 returns to block 1208.

While the example method 500 of FIG. 5, the example method 1100 of FIG. 11, and the example method 1200 of FIG. 12 are depicted as separate, the order of execution of the blocks of the methods 500, 1100, 1200 may be changed, interchanged between the methods 500, 1100, 1200 and/or some of the blocks described may be changed, eliminated, or combined. Additionally, some or all of the blocks of the methods 500, 1100, 1200 indicated as executed by the indicator system 800 can be executed by the load manager 102, and vice versa. For example, after the execution of block 508 of FIG. 5, the indicator system 800 and/or the load manager 102 can execute some or all of the blocks 1102-1116 of FIG. 11 and/or blocks 1202-1216 of FIG. 12. In other examples, any combination and/or ordering of the blocks 502-524 of FIG. 5, blocks 1102-1112 of FIG. 11, and blocks 1202-1212 of FIG. 12 can be executed by the load manager 102 and/or indicator system 800.

Figure 13:
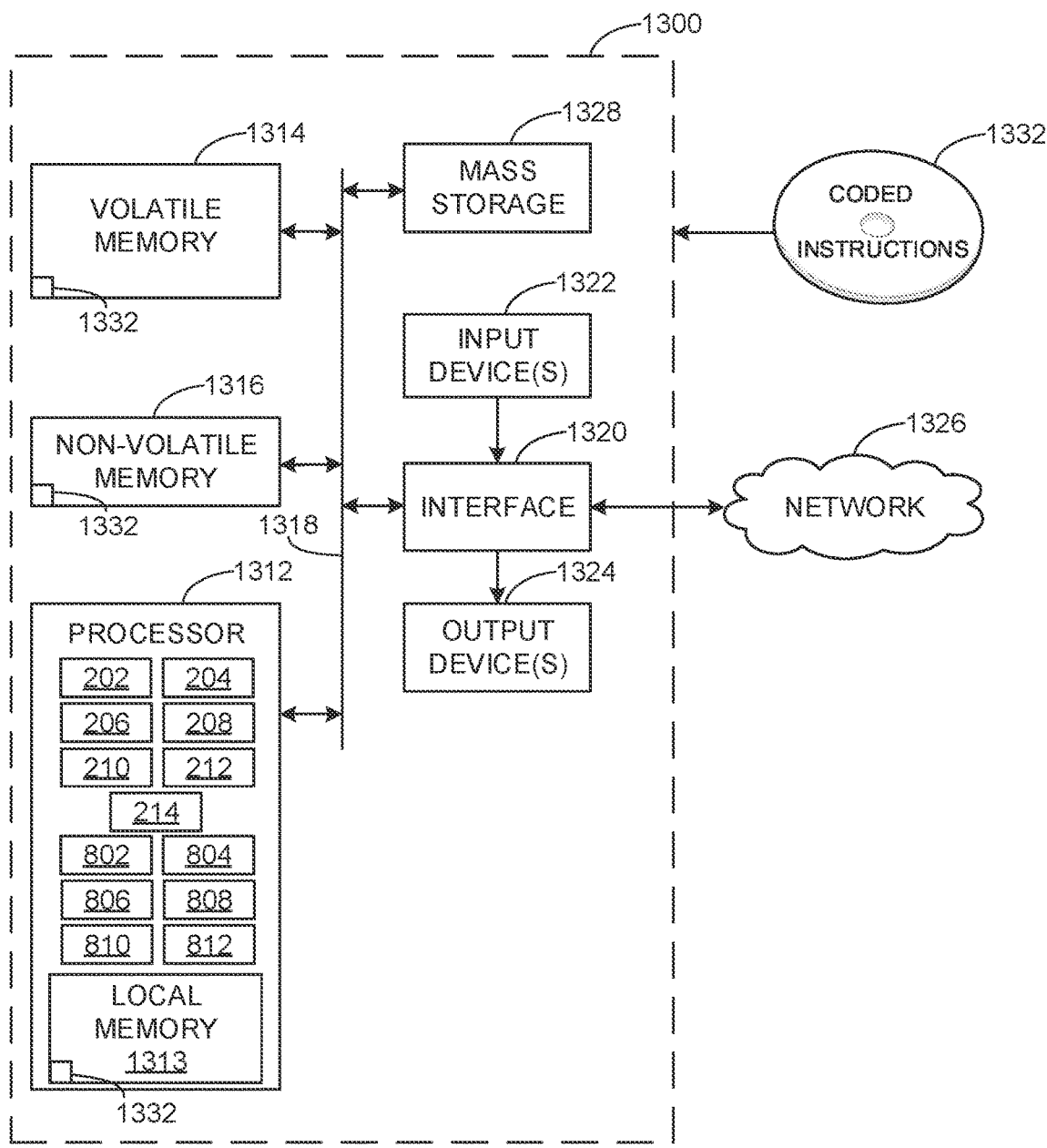
FIG. 13 is a block diagram of an example processor platform structured to execute instructions to carry out the example methods of FIGS. 5, 11, and 12 and/or, more generally, to implement the vehicle load condition manager of FIG. 2 and the example indicator system of FIG. 8.

FIG. 13 is a block diagram of an example processor platform 1300 capable of executing instructions of FIG. 5 to implement the vehicle load manager 102 of FIG. 2 and/or executing the instructions of FIGS. 11-12 to implement the vehicle controller 612 of FIG. 8. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1312 implements the example sensor interface 202, the example load mapper 204, the example object identifier 206, the example object-to-weight correlator 208, the example condition determiner 210, the example guidance generator 212 and the example augmented reality generator 214, the example light interface 802, the example horn interface 803, the example sensor interface 804, the example database 806, the example threshold calculator 808, the example parameter 810, and the example adjustment calculator 812.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1320 of the illustrated example, thus, typically includes a graphics driver card, a graphics driver chip, and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 to implement the methods of FIGS. 5, 11 and/or 12 may be stored in the mass storage device 1328, in the volatile memory 1314, in the non-volatile memory 1316, and/or on a removable non-transitory computer readable storage medium such as a CD or DVD.

Example methods and apparatus to generate an augmented environment including a weight indicator for a vehicle are disclosed herein. Further examples and combinations thereof include the following:

Example 1 includes an apparatus comprising memory including stored instructions, a processor to execute the instructions to generate a map of loads on a vehicle based on load data associated with a sensor of the vehicle, determine a load condition of the vehicle based on the map of loads, correlate a first load of the map of loads with an object identified using live video data received from a camera, and generate an augmented environment identifying at least one of a location of the object, the first load correlated with the object, or the load condition.

Example 2 includes the apparatus of example 1, wherein the processor executes the instructions to, when the load condition of the vehicle is misloaded, modifying the augmented environment with a visual indication based on the load condition, the visual indication including an instruction to move the object.

Example 3 includes the apparatus of example 1, wherein the processor executes the instructions to determine the load condition includes comparing a second load on the vehicle to a first load threshold, the second load determined based on the load data, and the processor executes the instructions to control an external light of the vehicle based on the comparison to visually indicate the load condition.

Example 4 includes the apparatus of example 3, wherein the processor executes instructions to control an external light of the vehicle based on the comparison to visually indicate to indicate the load condition by causing the external light to blink at a frequency based on the load condition.

Example 5 includes the apparatus of example 4, wherein the processor executes the instructions to cease blinking of the external light in response to the second load satisfying the first load threshold.

Example 6 includes the apparatus of example 3, wherein the external light includes a first light source, a second light source, and a third light source, and the processor executes the instructions to cause the first light source, the second light source, and the third light source to illuminate in a first pattern when the first load threshold is satisfied, and cause the first light source, the second light source, and the third light source to illuminate in a second pattern when a second load threshold is satisfied, the first load threshold is greater than the second load threshold.

Example 7 includes the apparatus of example 1, wherein the processor executes the instructions to determine the load condition by comparing a second load on the vehicle to a first load threshold, the second load determined based on the load data, and the processor executes instructions to cause a horn of the vehicle to sound based on the comparison to indicate the load condition.

Example 8 includes a method comprising generating a map of loads on a vehicle based on load data associated with a sensor of the vehicle, determining a load condition of the vehicle based on the map of loads, correlating a first load of the map of loads with an object identified using live video data received from a camera, and generating an augmented environment identifying at least one of a location of the object, the first load correlated with the object, or the load condition.

Example 9 includes the method of example 8, further including, when the vehicle is misloaded, modifying the augmented environment with a visual indication based on the load condition, the visual indication including an instruction to move the object.

Example 10 includes the method of example 8, wherein the determining the load condition includes comparing a second load on the vehicle to a first load threshold, the second load determined based on the load data, and further including controlling an external light of the vehicle based on the comparison to indicate the load condition.

Example 11 includes the method of example 10, wherein controlling the external light of the vehicle based on the comparison to visually indicate to indicate the load condition includes causing the external light to blink at a frequency based on the second load.

Example 12 includes the method of example 10, wherein the external light includes a first light source, a second light source, and a third light source, and further including causing the first light source, the second light source, and the third light source to illuminate in a first pattern when the first load threshold is satisfied, and causing the first light source, the second light source, and the third light source to illuminate in a second pattern when a second load threshold is satisfied, the first load threshold is greater than the second load threshold.

Example 13 includes the method of example 8, wherein the determining the load condition includes comparing a second load on the vehicle to a first load threshold, the second load determined based on the load data and further including causing a horn of the vehicle to sound based on the comparison to indicate the load condition.

Example 14 includes a non-transitory computer readable medium comprising instructions, which, when executed cause a processor to generate a map of loads on a vehicle based on load data associated with a sensor of the vehicle, determine a load condition of the vehicle based on the map of loads, correlate a first load of the map of loads with an object identified using live video data received from a camera, and generate an augmented environment identifying at least one of a location of the object, the first load correlated with the object, or the load condition.

Example 15 includes the non-transitory computer readable medium of example 14, wherein the instructions, when executed, cause the processor to, when the vehicle is misloaded, modify the augmented environment with a visual indication based on the load condition, the visual indication including an instruction to move the object.

Example 16 includes the non-transitory computer readable medium of example 14, wherein the determination of the load condition includes comparing a second load on the vehicle to a first load threshold, the second load determined based on the load data, and the instructions, when executed, cause the processor to control an external light of the vehicle based on the comparison to indicate the load condition.

Example 17 includes the non-transitory computer readable medium of example 16, wherein the instructions, when executed, cause the processor to control the external light of the vehicle based on the comparison to visually indicate to indicate the load condition by causing the external light to blink at a frequency based on the second load.

Example 18 includes the non-transitory computer readable medium of example 17, wherein the instructions, when executed, cause the processor to cease blinking of the external light in response to the second load satisfying the first load threshold.

Example 19 includes the non-transitory computer readable medium of example 16, wherein the external light includes a first light source, a second light source, and a third light source, and the instructions, when executed, cause the processor to cause the first light source, the second light source, and the third light source to illuminate in a first pattern when the first load threshold is satisfied, and cause the first light source, the second light source, and the third light source to illuminate in a second pattern when a second load threshold is satisfied, the first load threshold is greater than the second load threshold.

Example 20 includes the non-transitory computer readable medium of example 14, wherein the determination of the load condition includes comparing a second load on the vehicle to a first load threshold, the second load determined based on the load data and the instructions, when executed, cause the processor to causing a horn of the vehicle to sound based on the comparison to indicate the load condition.

Example 21 includes a method of indicating a loading of a vehicle comprising generating a map of loads on a vehicle based on load data associated with a sensor of the vehicle, determining the load condition of the vehicle based on the map of loads by comparing a load on the vehicle to a first load threshold, the load determined based on the load data, generating an augmented environment identifying the load condition, and controlling an external light of the vehicle based on the comparison of the load to the load threshold to indicate the load condition.

Example 22 includes the method of example 21, further including, when the vehicle is misloaded, modifying the augmented environment with a visual indication based on the load condition.

Example 23 includes the method of example 21, wherein the external light includes a first light source, a second light source, and a third light source, and further including causing the first light source, the second light source, and the third light source to illuminate in a first pattern when the first load threshold is satisfied, and causing the first light source, the second light source, and the third light source to illuminate in a second pattern when a second load threshold is satisfied, the first load threshold is greater than the second load threshold. Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus comprising:
   memory including stored instructions;
   a processor to execute the instructions to:
   generate a map of loads on a vehicle based on load data associated with a sensor of the vehicle;
   determine a load condition of the vehicle based on the map of loads;
   correlate a first load of the map of loads with an object identified using live video data received from a camera; and
   generate an augmented environment identifying at least one of a location of the object, the first load correlated with the object, or the load condition.

2. The apparatus of claim 1, wherein the processor executes the instructions to, when the load condition of the vehicle is misloaded, modifying the augmented environment with a visual indication based on the load condition, the visual indication including an instruction to move the object.

3. The apparatus of claim 1, wherein the processor executes the instructions to determine the load condition includes comparing a second load on the vehicle to a first load threshold, the second load determined based on the load data, and the processor executes the instructions to control an external light of the vehicle based on the comparison to visually indicate the load condition.

4. The apparatus of claim 3, wherein the processor executes instructions to control the external light of the vehicle based on the comparison to visually indicate to indicate the load condition by causing the external light to blink at a frequency based on the load condition.

5. The apparatus of claim 4, wherein the processor executes the instructions to cease blinking of the external light in response to the second load satisfying the first load threshold.

6. The apparatus of claim 3, wherein the external light includes a first light source, a second light source, and a third light source, and the processor executes the instructions to:
cause the first light source, the second light source, and the third light source to illuminate in a first pattern when the first load threshold is satisfied; and
cause the first light source, the second light source, and the third light source to illuminate in a second pattern when a second load threshold is satisfied, the first load threshold is greater than the second load threshold.

7. The apparatus of claim 1, wherein the processor executes the instructions to determine the load condition by comparing a second load on the vehicle to a first load threshold, the second load determined based on the load data, and the processor executes instructions to cause a horn of the vehicle to sound based on the comparison to indicate the load condition.

8. A method comprising:
generating a map of loads on a vehicle based on load data associated with a sensor of the vehicle;
determining a load condition of the vehicle based on the map of loads;
correlating a first load of the map of loads with an object identified using live video data received from a camera; and
generating an augmented environment identifying at least one of a location of the object, the first load correlated with the object, or the load condition.

9. The method of claim 8, further including, when the vehicle is misloaded, modifying the augmented environment with a visual indication based on the load condition, the visual indication including an instruction to move the object.

10. The method of claim 8, wherein the determining the load condition includes comparing a second load on the vehicle to a first load threshold, the second load determined based on the load data, and further including controlling an external light of the vehicle based on the comparison to indicate the load condition.

11. The method of claim 10, wherein controlling the external light of the vehicle based on the comparison to visually indicate to indicate the load condition includes causing the external light to blink at a frequency based on the second load.

12. The method of claim 10, wherein the external light includes a first light source, a second light source, and a third light source, and further including:
causing the first light source, the second light source, and the third light source to illuminate in a first pattern when the first load threshold is satisfied; and
causing the first light source, the second light source, and the third light source to illuminate in a second pattern when a second load threshold is satisfied, the first load threshold is greater than the second load threshold.

13. The method of claim 8, wherein the determining the load condition includes comparing a second load on the vehicle to a first load threshold, the second load determined based on the load data and further including causing a horn of the vehicle to sound based on the comparison to indicate the load condition.

14. A non-transitory computer readable medium comprising instructions, which, when executed cause a processor to:
generate a map of loads on a vehicle based on load data associated with a sensor of the vehicle;
determine a load condition of the vehicle based on the map of loads;
correlate a first load of the map of loads with an object identified using live video data received from a camera; and
generate an augmented environment identifying at least one of a location of the object, the first load correlated with the object, or the load condition.

15. The non-transitory computer readable medium of claim 14, wherein the instructions, when executed, cause the processor to, when the vehicle is misloaded, modify the augmented environment with a visual indication based on the load condition, the visual indication including an instruction to move the object.

16. The non-transitory computer readable medium of claim 14, wherein the determination of the load condition includes comparing a second load on the vehicle to a first load threshold, the second load determined based on the load data, and the instructions, when executed, cause the processor to control an external light of the vehicle based on the comparison to indicate the load condition.

17. The non-transitory computer readable medium of claim 16, wherein the instructions, when executed, cause the processor to control the external light of the vehicle based on the comparison to visually indicate to indicate the load condition by causing the external light to blink at a frequency based on the second load.

18. The non-transitory computer readable medium of claim 17, wherein the instructions, when executed, cause the processor to cease blinking of the external light in response to the second load satisfying the first load threshold.

19. The non-transitory computer readable medium of claim 16, wherein the external light includes a first light source, a second light source, and a third light source, and the instructions, when executed, cause the processor to:
cause the first light source, the second light source, and the third light source to illuminate in a first pattern when the first load threshold is satisfied; and
cause the first light source, the second light source, and the third light source to illuminate in a second pattern when a second load threshold is satisfied, the first load threshold is greater than the second load threshold.

20. The non-transitory computer readable medium of claim 14, wherein the determination of the load condition includes comparing a second load on the vehicle to a first load threshold, the second load determined based on the load data and the instructions, when executed, cause the processor to causing a horn of the vehicle to sound based on the comparison to indicate the load condition.

21. A method of indicating a loading of a vehicle comprising:
generating a map of loads on the vehicle based on load data associated with a sensor of the vehicle;
determining a load condition of the vehicle based on the map of loads by comparing a load on the vehicle to a first load threshold, the load determined based on the load data;
generating an augmented environment identifying the load condition; and
controlling an external light of the vehicle based on the comparison of the load to the first load threshold to indicate the load condition.

22. The method of claim 21, further including, when the vehicle is misloaded, modifying the augmented environment with a visual indication based on the load condition.

23. The method of claim 21, wherein the external light includes a first light source, a second light source, and a third light source, and further including:
  causing the first light source, the second light source, and the third light source to illuminate in a first pattern when the first load threshold is satisfied; and
  causing the first light source, the second light source, and the third light source to illuminate in a second pattern when a second load threshold is satisfied, the first load threshold is greater than the second load threshold.

* * * * *